United States Patent [19]
Kurishige et al.

[11] Patent Number: 6,161,068
[45] Date of Patent: Dec. 12, 2000

[54] ELECTRIC POWER STEERING CONTROL SYSTEM

[75] Inventors: Masahiko Kurishige; Noriyuki Inoue; Takayuki Kifuku; Susumu Zeniya, all of Tokyo, Japan

[73] Assignee: Mitsubishi Denki Kabushiki Kaisha, Tokyo, Japan

[21] Appl. No.: 09/340,385

[22] Filed: Jun. 28, 1999

[30] Foreign Application Priority Data

Dec. 1, 1998 [JP] Japan .................................. 10-341956

[51] Int. Cl.⁷ ........................................................ B62D 6/00
[52] U.S. Cl. ........................... 701/41; 180/400; 180/412; 180/413; 180/446; 318/140; 318/432; 318/433; 318/503
[58] Field of Search ............................... 701/41; 180/400, 180/412, 413, 446; 318/140, 147, 432, 433, 503

[56] References Cited

U.S. PATENT DOCUMENTS

| | | |
|---|---|---|
| 4,789,040 | 12/1988 | Morishita et al. ........................ 180/142 |
| 4,939,436 | 7/1990 | Morishita et al. ........................ 318/434 |
| 5,076,381 | 12/1991 | Daido et al. ............................. 180/79.1 |
| 5,740,040 | 4/1998 | Kifuku et al. ............................ 364/424 |

OTHER PUBLICATIONS

"Steering Technology Powered by an Electric Motor", Technical Journal of Mitsubishi Electric Co., Ltd., vol. 70, No. 9, pp. 43–48, 1996, no month.

Primary Examiner—William A. Cuchlinski, Jr.
Assistant Examiner—Yonel Beaulieu
Attorney, Agent, or Firm—Leydig, Voit & Mayer, Ltd.

[57] ABSTRACT

An electric power steering control system reducing steering torque without making a driver feel uncomfortable torque oscillation, including a rotation speed observer for estimating the rotation speed of a motor based on the output of a torque sensor high pass filter (HPF) and the output of a drive current HPF obtained by removing a steering frequency component from a drive current detection value.

9 Claims, 16 Drawing Sheets

ELECTRIC POWER STEERING CONTROL SYSTEM

BACKGROUND OF THE INVENTION

1. Field of the Invention

The present invention relates to an electric power steering control system for assisting steering force with a motor.

2. Description of the Prior Art

FIG. 16 is a block diagram showing the constitution of an electric power steering control system of the prior art disclosed in Mitsubishi Technical Report Vol. 70, No. 9, pp.43–48, for example. In FIG. 16, reference numeral 1 denotes a torque sensor for detecting steering torque when a driver steers an automobile; 2, a phase compensator for improving the frequency characteristics of the output signal of the torque sensor 1; 3, a torque controller for computing an assist torque current for assisting the steering torque based on the phase compensated output of the torque sensor 1; 4, a damping controller for computing a damping current based on the rotation angle speed ωM of a motor 8 computed by unshown motor angle speed computing means, for example, 5 a compensation controller which consists of a friction compensator 5a for computing a friction compensation current for compensating the friction torque of the motor 8 and an inertia compensator 5b for computing an inertia compensating current for compensating the inertia moment of the motor 8 and which computes the friction computing current based on ωM and inertia compensating current based on the rotation angle acceleration (dωM/dt) obtained by differentiating ωM, and 6 an adder for computing a target current by adding the assist torque current computed by the torque controller 3, the damping current computed by the damping controller 4, and the friction compensating current and the inertia compensating current computed by the compensation controller 5. Denoted by 7 is a current controller for comparing the target current computed by the adder 6 with the drive current of the motor 8 output from a current detector 9 and carrying out current control to ensure that the drive current becomes equal to the target current.

A description is subsequently given of the operation of the electric power steering control system of the prior art.

When a driver operates the steering wheel of the automobile, steering torque at this point is measured by the torque sensor 1, phase compensated by the phase compensator 2 to improve the frequency characteristics thereof, and applied to the torque controller 3. The torque controller 3 computes an assist torque current almost proportional to the output signal of the torque sensor 1 whose frequency characteristics have been improved, the steering torque of the driver is assisted by driving the motor 8 based on the assist torque current, and the steering torque of the driver is thereby reduced.

At this point, to stabilize the movement of the steering wheel, the damping controller 4 computes a damping current proportional to the motor rotation angle speed ωM, and the damping current is added to the above assist torque current. To compensate for the influence of the friction of the motor 8, the friction compensation controller 5a adds a friction compensating current which changes according to the sign of the motor rotation angle speed ωM. To compensate for the influence of the inertia moment of the motor 8, the inertia compensation controller 5b adds an inertia compensating current proportional to the motor rotation angle acceleration (dωM/dt) obtained by differentiating the motor rotation angle speed ωM. These compensating currents are added to the assist torque current to compute a target current, and the current controller 7 controls a drive current to be supplied to the motor 8 based on the target current to generate assist torque proportional to the drive current, thereby reducing the steering torque of the driver and stabilizing the movement of the steering wheel. The controllers 3, 4 and 5 change control parameters according to car speed.

The assist torque current computed by the torque controller 3 takes a value almost proportional to the output signal of the torque sensor 1 whose frequency characteristics have been improved by the phase compensator 2. At this point, the larger the torque proportional gain set by the torque controller 3 the greater the assist torque becomes, thereby making it possible to reduce the steering torque of the driver. However, when the torque proportional gain is increased, oscillation of a control system occurs and the driver feels uncomfortable torque oscillation. Therefore, the torque proportional gain cannot be simply increased.

To prevent the oscillation, means of increasing a damping current is conceivable. However, in the prior art, when compensation is made to increase the damping current, this damping compensation functions as resistance when the steering wheel is turned, thereby increasing steering torque. Therefore, a large damping current cannot be added. Consequently, the torque proportional gain cannot be increased and the steering torque of the driver cannot be fully reduced when great assist torque is required as in the case where the steering wheel is turned while an automobile is stopped.

It is an object of the present invention, which has been made to solve the above problems, to provide an electric power steering control system which can reduce steering torque without making a driver feel uncomfortable torque oscillation.

SUMMARY OF THE INVENTION

According to a first aspect of the present invention, there is provided an electric power steering control system which comprises steering torque detection means for detecting the steering torque of a driver, a motor for generating torque for assisting the steering torque, rotation speed detection means for estimating or measuring the rotation speed of the motor and steering component removing means for removing a steering speed component from the estimated or measured rotation speed of the motor, and computes a damping current from a signal obtained by removing a steering speed component from a motor rotation speed measurement or estimation signal.

According to a second aspect of the present invention, there is provided an electric power steering control system wherein the steering component removing means is a frequency separator for separating the frequency of the rotation speed of the motor and removing a steering frequency component from the rotation speed of the motor.

According to a third aspect of the present invention, there is provided an electric power steering control system wherein the steering component removing means is a high-pass filter whose folding point frequency is set to a range of 0.2 to 30 Hz.

According to a fourth aspect of the present invention, there is provided an electric power steering control system wherein the rotation speed detection means is a rotation speed estimation unit for estimating the reverse voltage of the motor by subtracting a coil voltage drop equivalent value in the motor computed based on a motor current detection value or instruction value from a motor inter-terminal voltage measurement value or instruction value and computing a motor rotation speed estimation value based on the estimated reverse voltage.

According to a fifth aspect of the present invention, there is provided an electric power steering control system wherein the coil voltage drop equivalent value is computed by reverse characteristics computing means for obtaining a coil voltage corresponding to the reverse characteristics of coil impedance from a current detection value or instruction value to be applied to the motor.

According to a sixth aspect of the present invention, there is provided an electric power steering control system wherein the reverse characteristics computing means has such frequency characteristics that gain and phase thereof agree with the reverse characteristics of coil impedance only at a frequency at which steering oscillation occurs at the time of steering.

According to a seventh aspect of the present invention, there is provided an electric power steering control system wherein the rotation speed detection means comprises second steering component removing means for removing a steering component from a motor rotation angle detection value, third steering component removing means for removing a steering component from a current detection value or instruction value to be applied to the motor, and a rotation speed observer for computing a motor rotation speed estimation value based on a motor rotation angle and a motor current output from the second and third steering component removing means, which is constructed for an oscillation equation containing the inertia moment of the motor as an inertia term and the rigidity of the torque sensor as a spring term, and computes a damping current based on the motor rotation speed estimation value from which a steering speed component is removed and which is computed by the rotation speed observer.

According to an eighth aspect of the present invention, there is provided an electric power steering control system wherein the rotation speed detection means comprises third steering component removing means for removing a steering component from a current detection value or instruction value to be applied to the motor, fourth steering component removing means for removing a steering component from the output of the steering torque detection means, and a rotation speed observer for computing a motor rotation speed estimation value based on a motor current output and the steering torque output from the third and fourth steering component removing means, which is constructed for an oscillation equation containing the inertia moment of the motor as an inertia term and the rigidity of the motor as a spring term, and computes a damping current based on the motor rotation speed estimation value from which a steering speed component is removed and which is computed by the rotation speed observer.

According to a ninth aspect of the present invention, there is provided an electric power steering control system which further comprises car speed detection means to change a frequency range to be removed by any one or all of the above steering component removing means according to car speed. It is desirable that the parameters of a control system be variable according to car speed.

The above and other objects, features and advantages of the invention will become more apparent from the following description when taken in conjunction with the accompanying drawings.

BRIEF DESCRIPTION OF THE ACCOMPANYING DRAWINGS

Figure 9A:
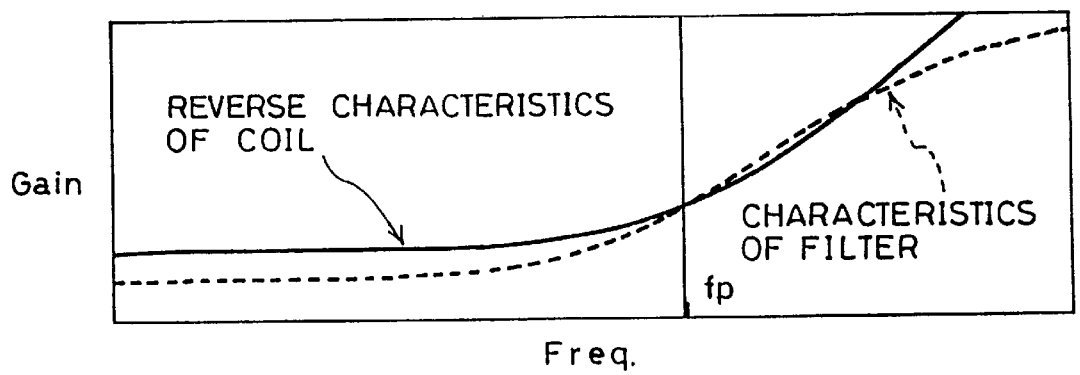
Figure 9B:
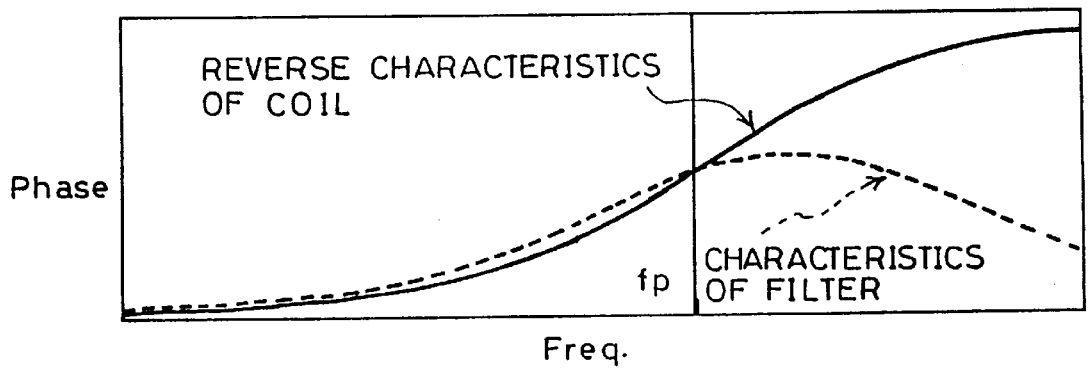
Figure 10:
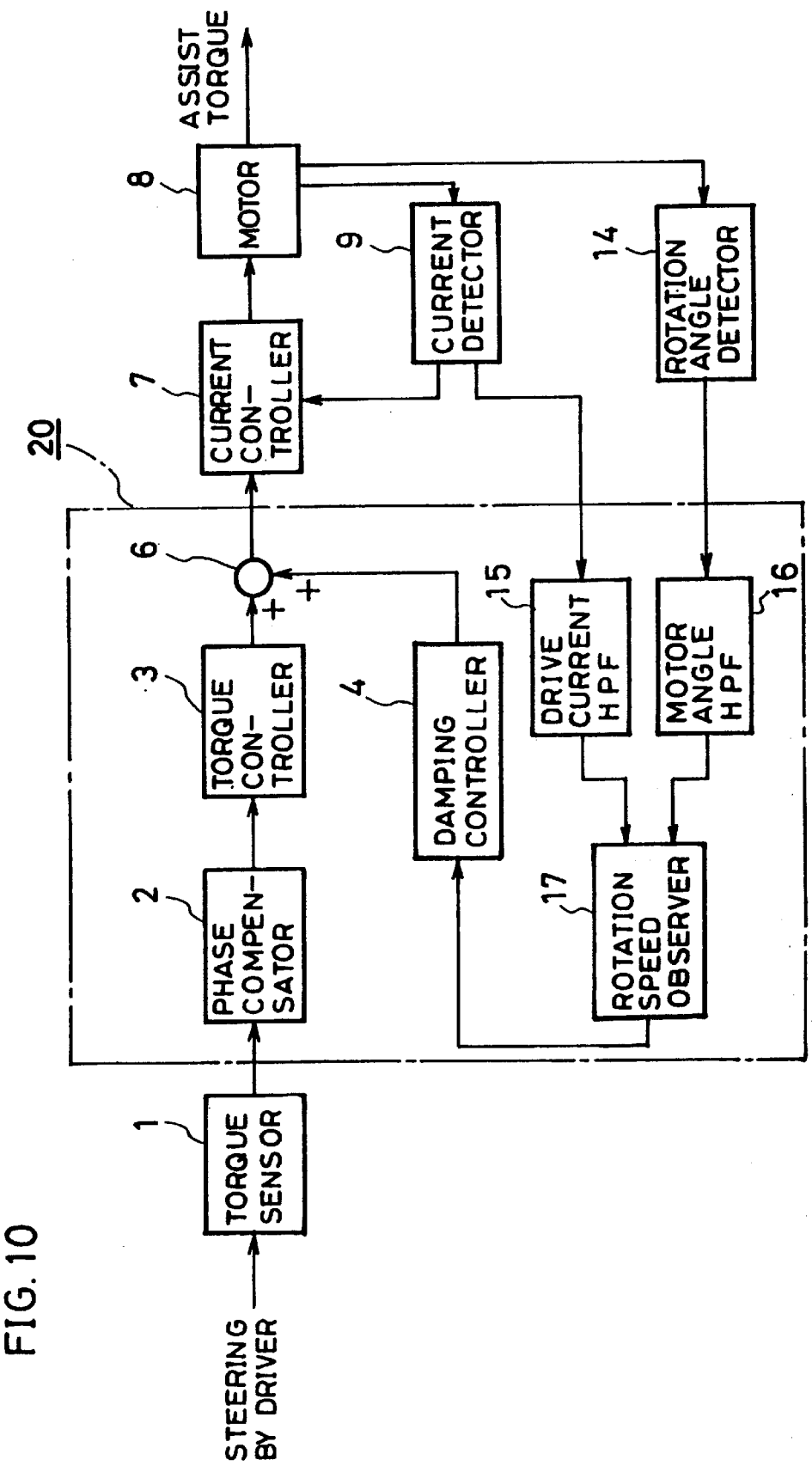
Figure 11:
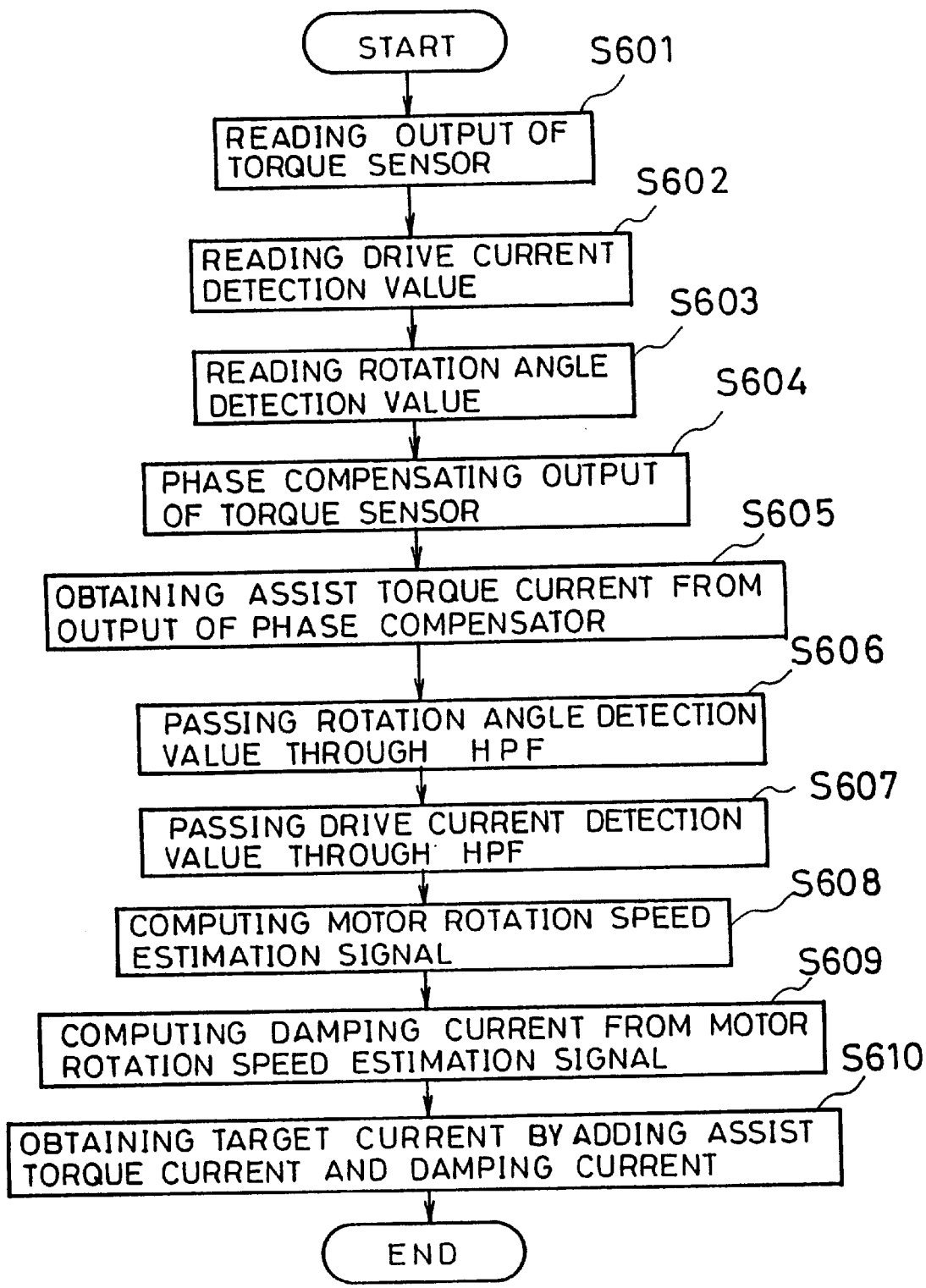
Figure 12:
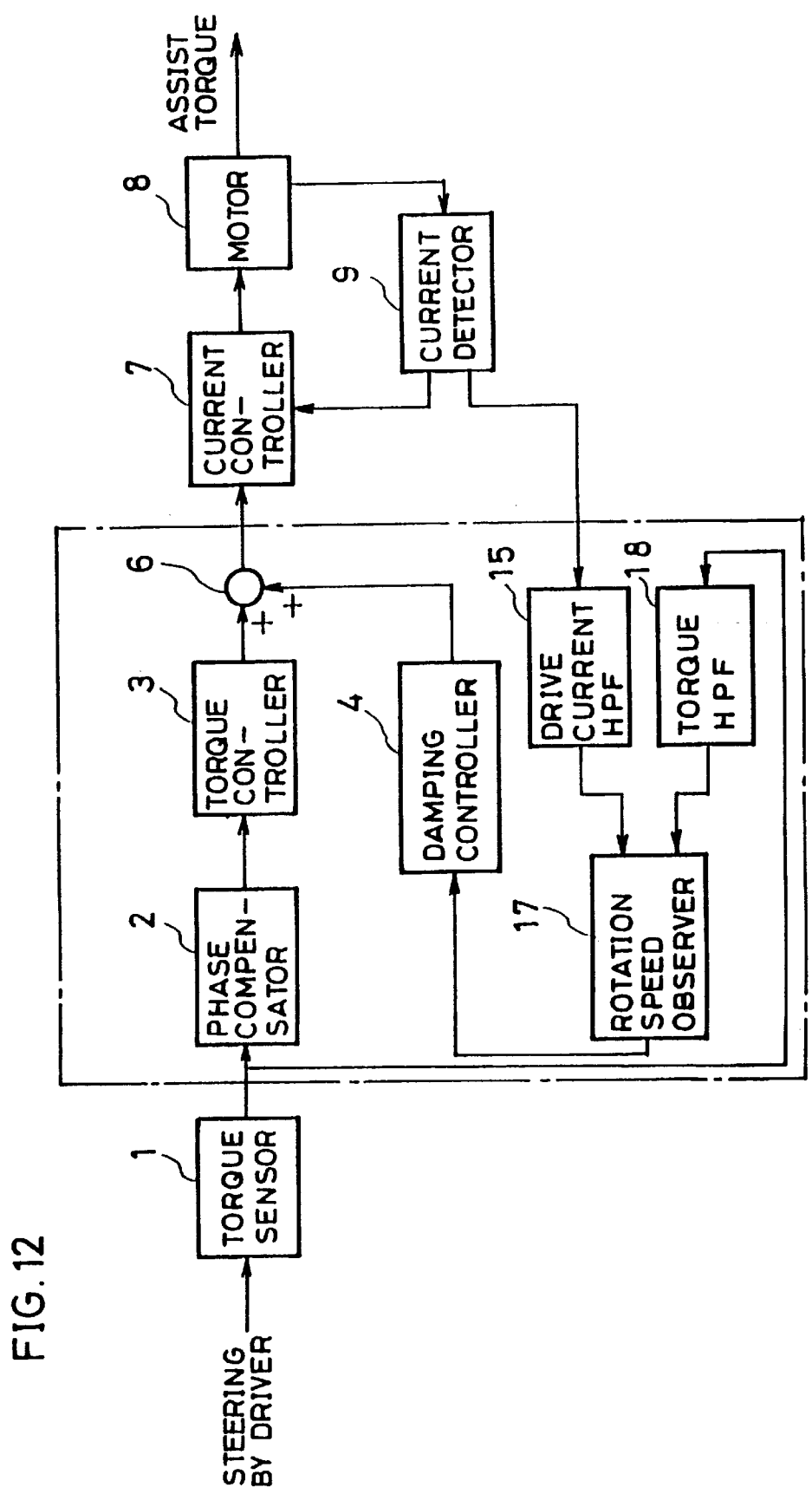
Figure 13:
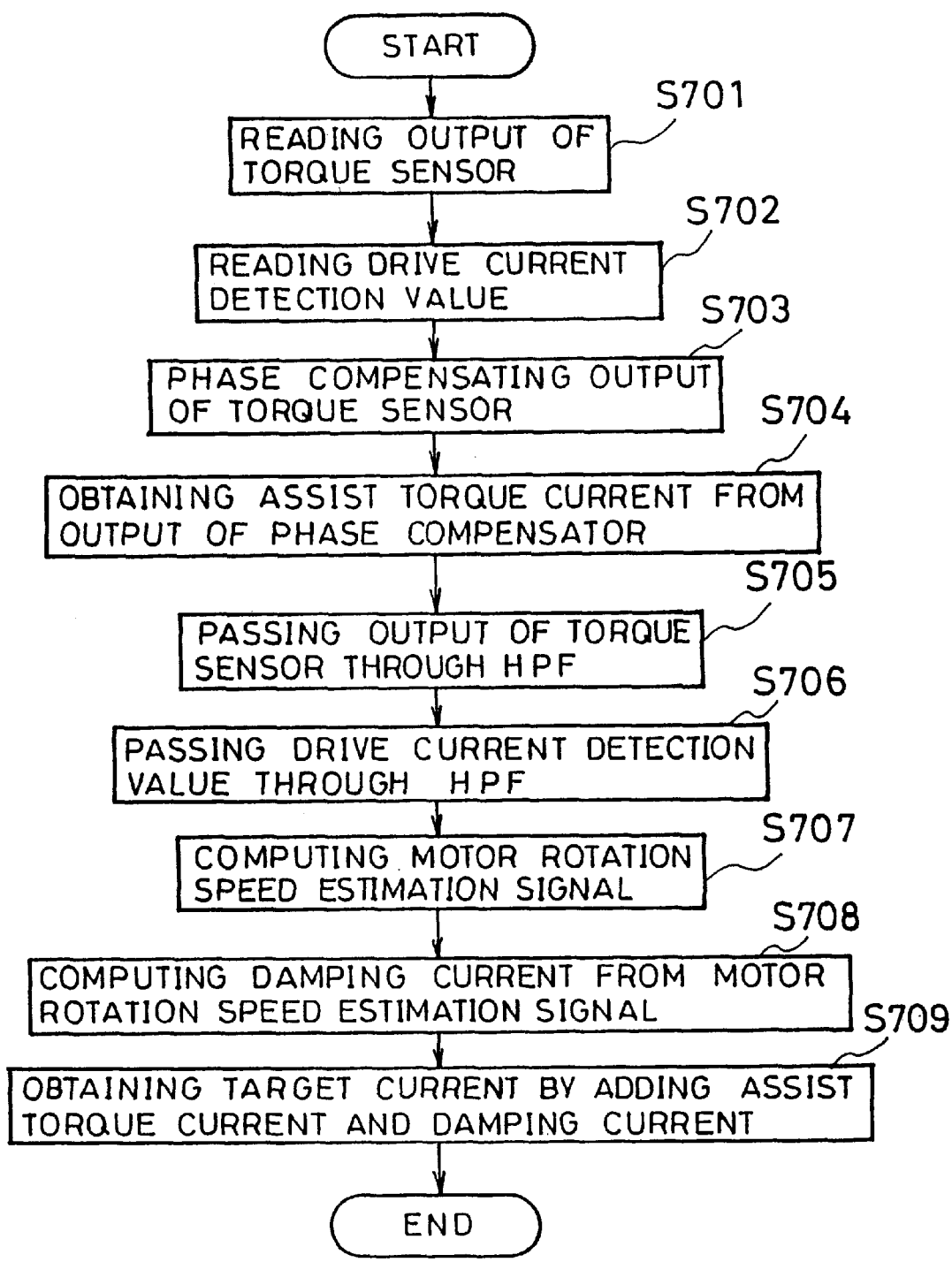
Figure 14:
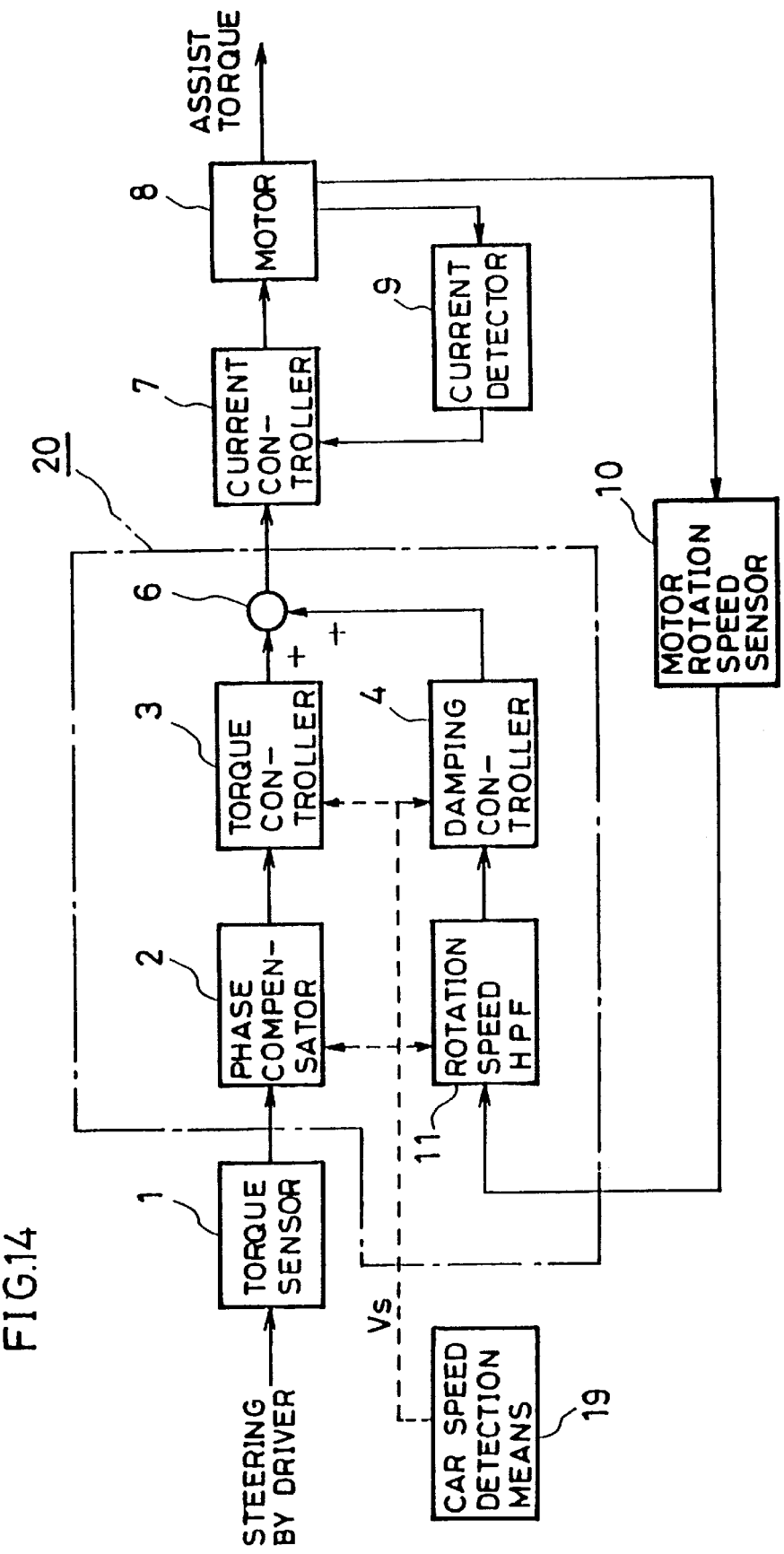
Figure 15:
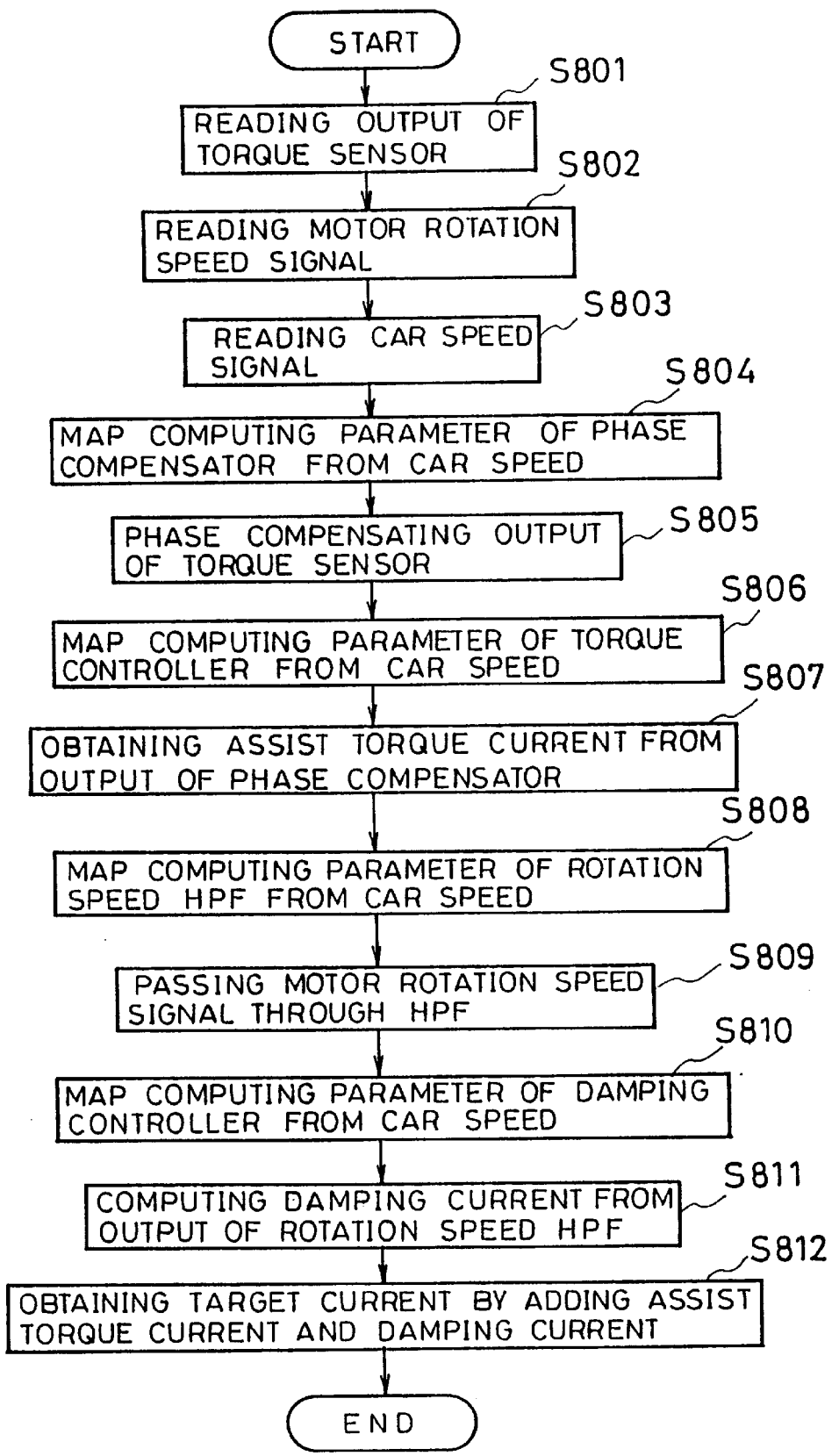

FIGS. 9($a$) and 9($b$) are graphs showing the characteristics of a filter corresponding to the reverse characteristics of a coil used in Embodiment 5;

FIG. 10 is a block diagram of an electric power steering control system according to Embodiment 6 of the present invention;

FIG. 11 is a flow chart showing an Embodiment 6;

FIG. 12 is a block diagram of an electric power steering control system according to Embodiment 7 of the present invention;

FIG. 13 is a flow chart showing an Embodiment 7;

FIG. 14 is a block diagram of an electric power steering control system according to Embodiment 8 of the present invention;

FIG. 15 is a flow chart showing an Embodiment 8; and

Figure 16:
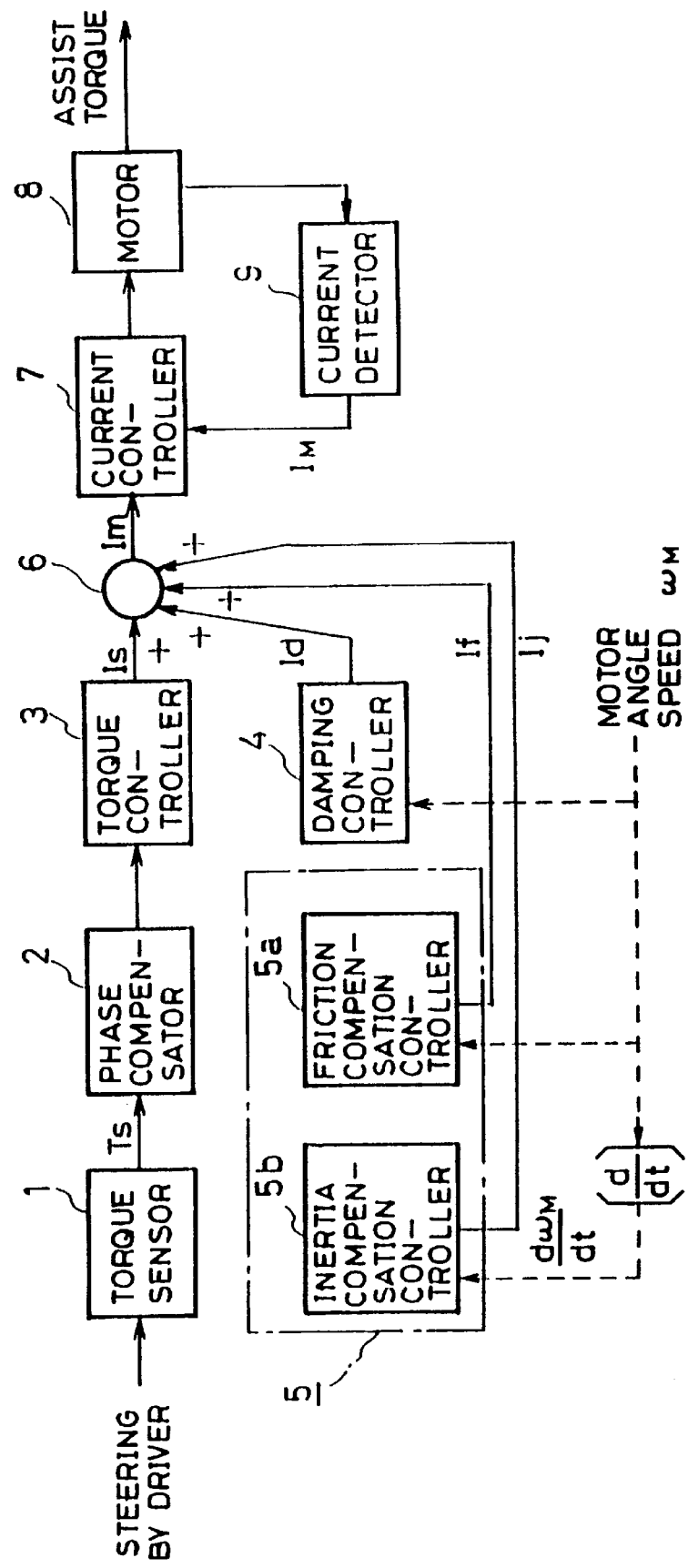

FIG. 16 is a block diagram of an electric power steering control system of the prior art.

DETAILED DESCRIPTION OF THE EMBODIMENTS

Preferred embodiments of the present invention will be described with reference to the accompanying drawings.

Embodiment 1

Figure 1:
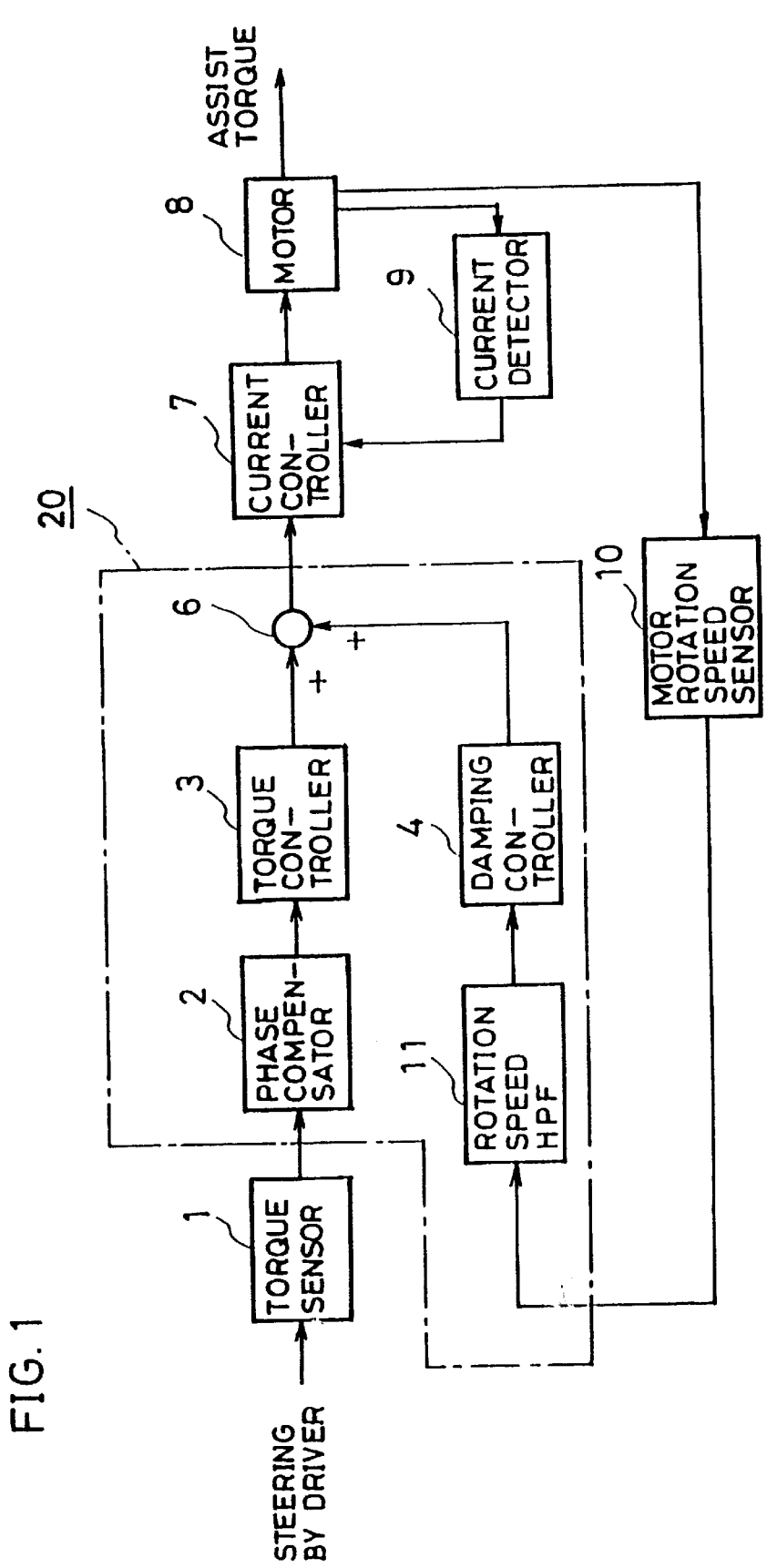
FIG. 1 is a block diagram of an electric power steering control system according to Embodiment 1 of the present invention.

FIG. 1 is a block diagram of an electric power steering control system according to Embodiment 1 of the present invention. In FIG. 1, reference numeral 1 denotes a torque sensor for detecting steering torque when a driver steers an automobile; 2, a phase compensator for phase compensating the output signal of the torque sensor 1 to improve frequency characteristics thereof; 3, a torque controller for computing an assist torque current for assisting the steering torque based on the phase compensated output of the torque sensor 1; 11, a rotation speed high-pass filter which has a steering component removing means for separating the frequency of a motor rotation speed signal output from a motor rotation speed sensor 10, such as a tachometer generator, to remove a steering frequency component from the motor rotation speed signal (referred to as "rotation speed HPF" hereinafter); 4, a damping controller for computing a damping current for controlling the damping characteristics of steering based on the output of the rotation speed HPF 11; and 6, an adder for computing a target current by adding the assist torque current computed by the torque controller 3 and the damping current computed by the damping controller 4. Denoted by 7 is a current controller for setting a drive voltage instruction value to be applied to the terminals of a motor 8 such that a drive current detection value to be applied to the motor 8 to generate assist torque and detected by a current detector 9 becomes equal to the above target current and outputting it as a pulse width modulation (PWM) signal, for example.

In the present invention, when target current computing means 20 which comprises the phase compensator 2, the rotation speed HPF 11 and the like encircled by a dotted line in the block diagram of FIG. 1 is constructed by microcomputer software alone, it is possible to solve the problems of the prior art. The case where the target current computing means 20 is constructed by microcomputer software will be described hereinunder. The above target current computing means 20 has unshown memories such as RAM's or ROM's for each or some of constituent elements and receives data such as the detection value of the torque sensor 1 and the like at intervals of a predetermined control sampling time, converts them into digital data and stores the digital data in data writing memories such as RAM's.

The rotation speed HPF 11 which is the steering component removing means will be described hereinunder.

Generally speaking, the frequency of steering by the driver is about 3 Hz or less. The steering frequency at the time of changing the lane is around 0.2 Hz and steering is carried out at such a low frequency in many cases. In contrast to this, the frequency at which steering oscillation easily occurs is 30 Hz or more and hence, can be separated from the steering frequency. Therefore, by constructing the steering component removing means by a frequency separator for separating the frequency of the estimated or measured rotation speed of the motor and removing a steering frequency component from the rotation speed of the motor, the steering component can be removed from the rotation speed of the motor.

To remove a low frequency component, a high-pass filter is generally used as the frequency separator. By passing the rotation speed of the motor 8 output from the motor rotation speed sensor 10 through the high-pass filter, a steering component which is a low frequency component can be removed. When the folding point frequency of the high-pass filter is set low at this point, a steering component easily remains and when the folding point frequency is set high, the phase shift of a steering oscillation component of the rotation speed of the motor obtained by passing through the high-pass filter is large. Therefore, by setting the folding point frequency of the high-pass filter to a range from a general steering frequency to a frequency at which steering oscillation occurs, it is made possible to remove a steering frequency component from the rotation speed of the motor, leaving a steering oscillation component untouched. In this Embodiment 1, a high-pass filter whose folding point frequency is set to a range of 0.2 to 30 Hz to achieve the maximum frequency of steering by an ordinary driver is used to remove a component of the rotation speed of the motor properly.

Figure 2:
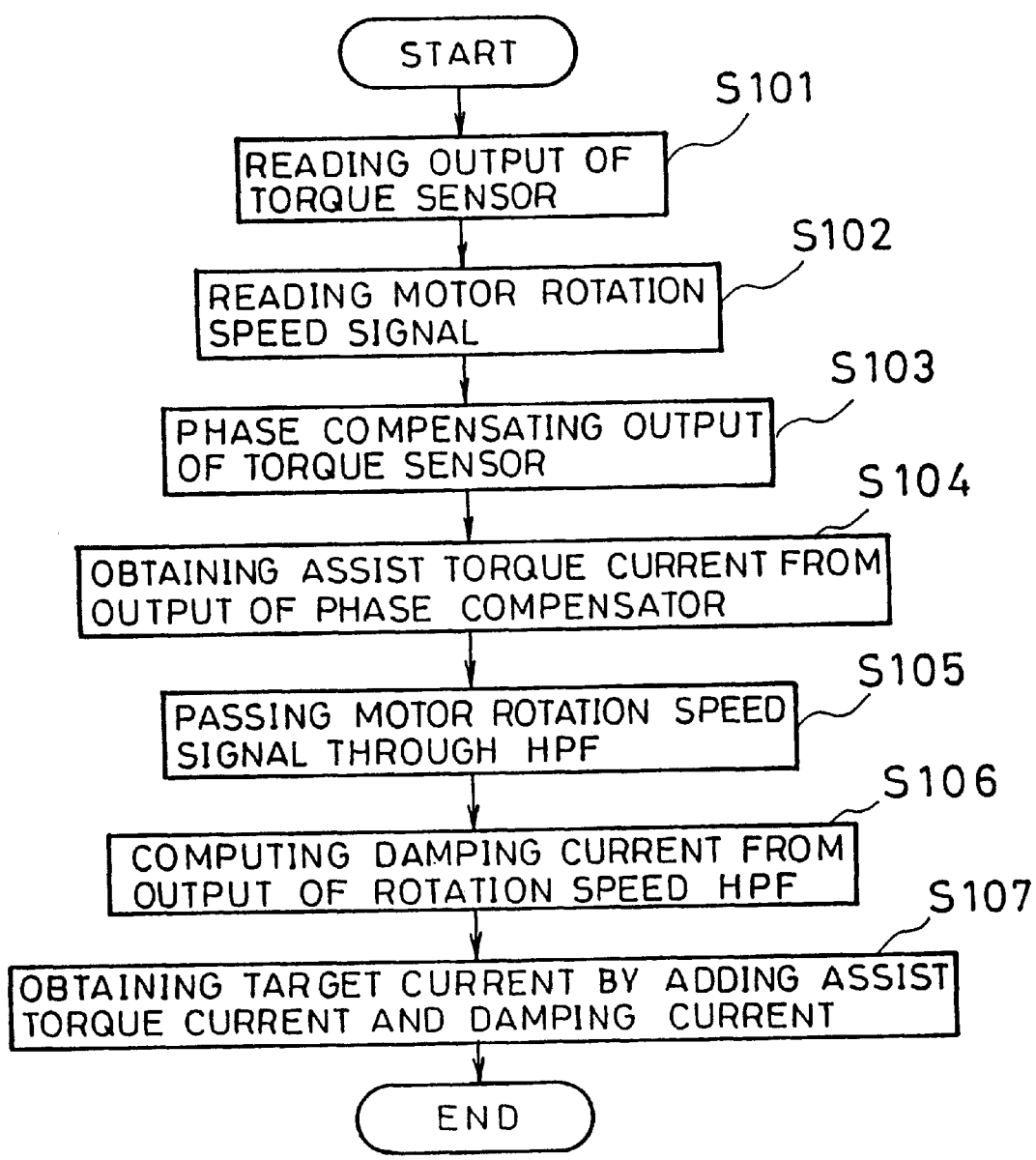
FIG. 2 is a flow chart showing an Embodiment 1.

A description is subsequently given of the operation of the above electric power steering control system with reference to the flow chart of FIG. 2. The present invention differs from the prior art in the method of computing a target current to be output to the current controller 7, by using an, algorithm for computing a target current by means of the target current computing means 20 of FIG. 1. As for the control of a drive current to be applied to the motor 8, control which is generally carried out, such as current F/B control of PID system or open-loop control based on a target current and a motor rotation signal, may be carried out based on digital or analog system. Therefore, only the algorithm for computing the target current of the motor 8 by means of the target current computing means 20 will be described hereinunder.

In step S101, the output of the torque sensor 1 is read to a microcomputer and stored in a memory. In step S102, the motor rotation speed signal of the motor rotation speed sensor 10 is read and stored in a memory. In the next step S103, the phase compensator 2 reads the output of the torque sensor 1 stored in the memory, carries out computation for phase compensation and stores the result of computation in the memory as the output of the phase compensator 2. In step S104, the torque controller 3 reads the output of the phase compensator 2 stored in the memory, computes an assist torque current from a map and stores it in the memory.

In step S105, the rotation speed HPF 11 reads the motor rotation speed signal stored in the memory, carries out the computation of a high-pass filter and stores the result of computation in the memory as the output of the rotation speed HPF. In step S106, the damping controller 4 reads the output of the rotation speed HPF stored in the memory, computes a damping current by multiplying the output by a control gain and stores it in the memory.

In step S107, the adder 6 adds the assist torque current and the damping current stored in the memories to obtain a target current and stores the target current in the memory.

The operation of the above steps from S101 to S107 is repeated for each control sampling, and the target current of the motor 8 is computed from the phase compensated output of the torque sensor 1 and the motor rotation speed signal from which a steering frequency component has been removed.

Each of the following are prestored in the ROMS's;

The map showing the relationship between the output of the torque sensor 1 and the assist torque current used in the above step S104; the map required for the computation of the target current such as the control gain for computing the damping current used in the above step S106; and all of the constants such as a proportional coefficient.

In Embodiment 1, the assist torque current is obtained by map computation and the damping current is obtained by gain multiplication. Both the assist torque current and the damping current may be obtained by either the map computation or the gain multiplication.

In the above example, the phase compensator 2 is a digital phase compensator but may be an analog phase compensator. Alternatively, the phase compensator 2 may comprise a hybrid of analog and digital phase compensators. In this case, the above step S101 is to read the output of the analog phase compensator obtained by phase compensating the output of the torque sensor 1 and not the output of the torque sensor 1 and to store it in the memory. When the phase compensator 2 is an analog phase compensator, the computation of the above step 103 is not necessary.

In Embodiment 1, the rotation speed of the motor is detected by the motor rotation speed sensor 10 such as a tachometer generator. A motor rotation angle signal may be detected by a rotary encoder, for example, and differentiated to obtain the rotation speed of the motor.

In Embodiment 1, the target current is obtained from the output of the torque controller 3 and the output of the damping controller 4. Like the prior art, a compensation controller 5 which comprises a friction compensation controller 5a and an inertia compensation controller 5b may be added to obtain the target current by further adding the output of the friction compensation controller and the output of the inertia compensation controller.

Thus, in this Embodiment 1, after a steering frequency component is removed from the motor rotation speed signal detected by the motor rotation speed sensor 10 using the rotation speed HPF 11, the damping current is computed by the damping controller 4 based on the output of the rotation speed HPF from which the above steering frequency component has been removed, thereby making it possible to prevent the oscillation of a control system even when the torque proportional gain is made large. Therefore, since damping can be made powerful by increasing the control gain (torque proportional gain) of the damping controller 4, the steering torque can be reduced without making the driver feel the vibration of the steering wheel.

Embodiment 2

Figure 3:
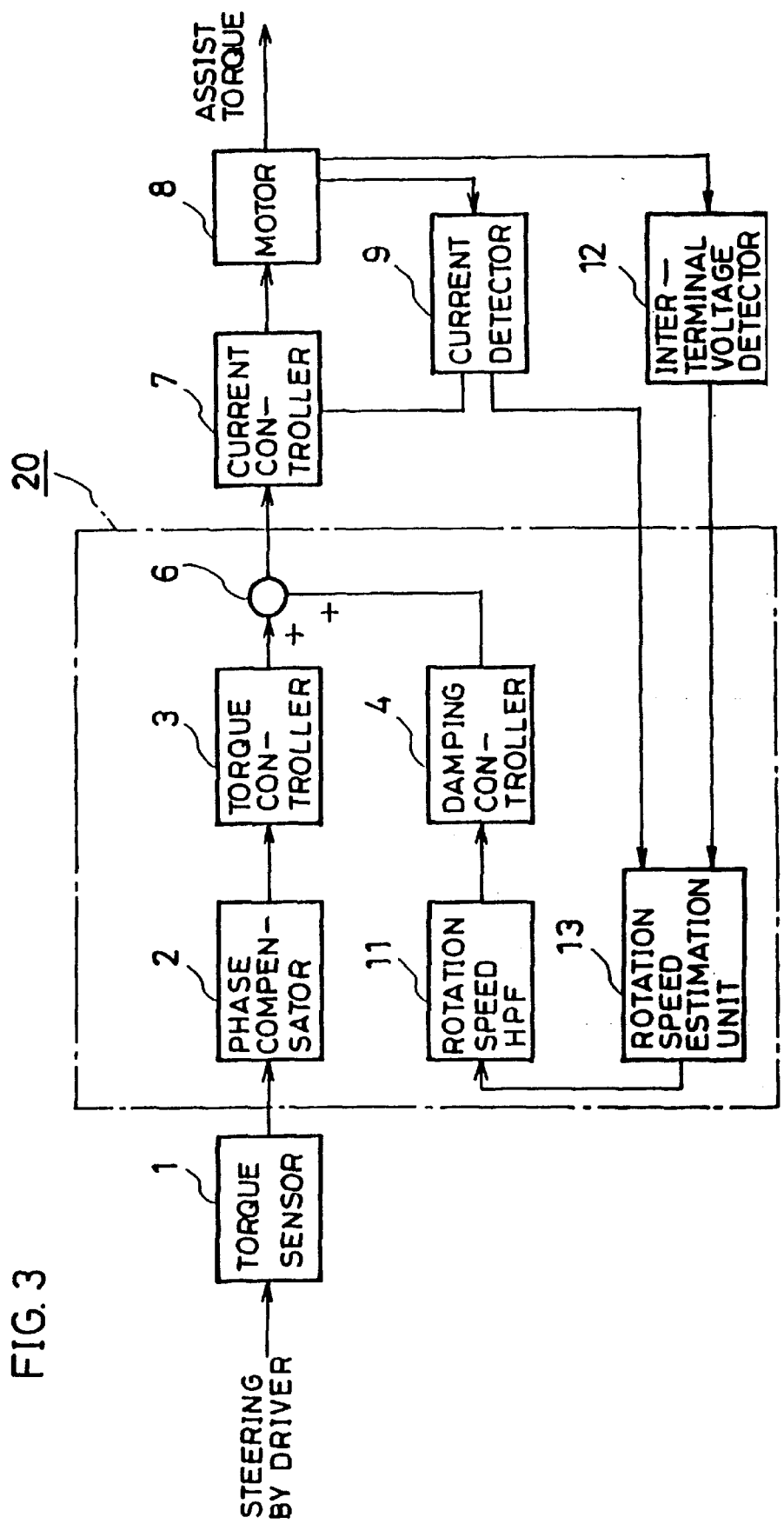
FIG. 3 is a block diagram of an electric power steering control system according to Embodiment 2 of the present invention.

FIG. 3 is a block diagram showing an electric power steering control system according to Embodiment 2 of the present invention. In the above Embodiment 1, the rotation speed HPF 11 is provided and a damping current is computed based on the output of the rotation speed HPF which is obtained by removing a steering frequency component from the motor rotation speed signal from the motor rotation speed sensor 10. In Embodiment 2, as shown in FIG. 3, the motor rotation speed sensor 10 is omitted, an inter-terminal voltage detector 12 for detecting voltage between the terminals of the motor 8 and a rotation speed estimation unit 13 for estimating the rotation speed of the motor 8 based on an inter-terminal voltage detection value detected by the inter-terminal voltage detector 12 and a drive current detection value detected by the current detector 9 are provided to estimate the rotation speed of the motor, a motor rotation speed estimation signal output from the rotation speed estimation unit 13 is applied to the rotation speed HPF 11 to remove a steering frequency component from the motor rotation speed estimation signal, and the damping controller 4 computes a damping current based on the output of the rotation speed HPF from which the above steering frequency component has been removed.

Figure 4:
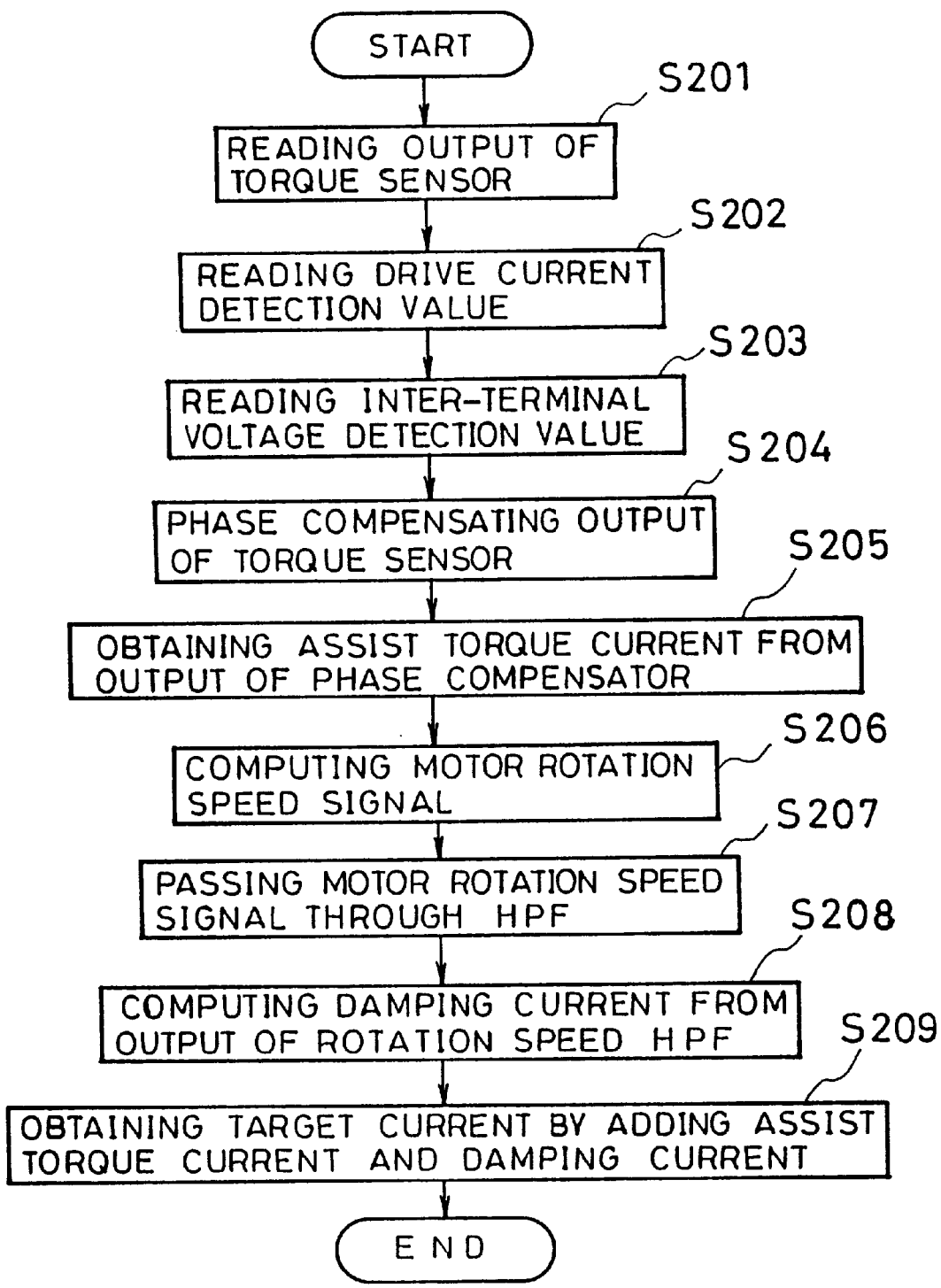
FIG. 4 is a flow chart showing an Embodiment 2.

A description is subsequently given of the operation of the above electric power steering control system with reference to the flow chart of FIG. 4. Only an algorithm for computing a target current by means of the target current computing means 20 in this Embodiment 2 will be described.

The output of the torque sensor 1 is first read and stored in the memory in step S201, a drive current detection value is read from the current detector 9 and stored in the memory in step S202, and an inter-terminal voltage detection value is read from the inter-terminal voltage detector 12 and stored in the memory instep S203. Instep S204, the phase compensator 2 reads the output of the torque sensor stored in the memory, carries out computation for phase compensation and stores the result of computation in the memory as the output of the phase compensator. In step S205, the torque controller 3 reads the output of the phase compensator stored in the memory, computes an assist torque current from the map and stores it in the memory.

In step S206, the rotation speed estimation unit 13 reads the drive current detection value (Isns) and the inter-terminal voltage detection value (Vt-sns) stored in the memories, computes a motor rotation speed estimation signal (ωest_bk) from the following equation (1) and stores it in the memory.

$$\omega est\_bk = (Vt\text{-}sns - Vcomp - Isns \times Rac)/Kec \quad (1)$$

In the above equation (1), Vcomp is a compensation value corresponding to a voltage drop Vdrop of coil application voltage Va for the inter-terminal voltage Vt of the motor 8, Rac is a coil resistance equivalent value and Kec is a reverse voltage constant equivalent value. How to compute the above motor rotation speed estimation signal ωest_bk will be described in detail hereinafter.

In the subsequent step S207, the rotation speed HPF 11 reads the motor rotation speed estimation signal ωest_bk stored in the memory, carries out the computation of a high-pass filter and stores the result of computation in the memory as the output of the rotation speed HPF. Instep S208, the damping controller 4 reads the output of the rotation speed HPF stored in the memory, and multiplies it by a control gain to compute a damping current. In step S209, the adder 6 adds the assist torque current and the damping current stored in the memories to obtain a target current and stores the target current in the memory.

The operation of the above steps from S201 to S209 is repeated for each control sampling, and the target current of the motor 8 is computed from the phase compensated output of the torque sensor and the motor rotation speed estimation signal from which a steering frequency component has been removed.

How to compute the motor rotation speed estimation signal ωest_bk will be described hereinunder in detail.

The reverse voltage Ve of the motor is expressed as the product of a known reverse voltage constant Ke and a motor rotation speed ω according to the following equation (2).

$$Ve = Ke \cdot \omega \quad (2)$$

By estimating the reverse voltage Ve of the motor, the motor rotation speed estimation signal ωest_bk which is an estimation value of the motor rotation speed ω can be obtained from ω=Ve/Ke according to the above equation Ve=Ke·ω.

The reverse voltage Ve can be computed from a coil application voltage Va and a coil voltage drop Vc as shown in the following equation (3).

$$Ve = Va - Vc \quad (3)$$

The coil voltage drop Vc is obtained from an already known coil resistance value Ra, coil inductance value La and motor current Ia according to the following equation (4).

$$Vc = Ra \cdot Ia + La \cdot (dIa/dt) \quad (4)$$

In the above equation (4), the second term of the right side signifies the influence of inductance. Since the influence of inductance is small at a frequency range other than a high frequency range and noise is readily superimposed on a signal obtained by differentiating a current detection value, the coil voltage drop Vc is often represented by the following equation (5) in which the above second term is omitted.

$$Vc \approx Ra \cdot Ia \quad (5)$$

Although the coil application voltage Va cannot be measured directly, since the relationship between motor inter-terminal voltage Vt and coil application voltage Va is represented by the following equation (6), the value of coil application voltage Va can be estimated by grasping the characteristics of voltage drop Vdrop from Vt to Va.

$$Va = Vt - V\text{drop} \quad (6)$$

Therefore, since the reverse voltage Ve of the motor is obtained from the above equations (3), (5) and (6), $$Ve = Va - Vc \approx Va - Ra \cdot Ia = Vt - V\text{drop} - Ra \cdot Ia$$

the motor rotation speed estimation signal ωest_bk can be obtained from an inter-terminal voltage detection value Vt-sns corresponding to the above motor inter-terminal voltage Vt, a compensation value Vcomp corresponding to the voltage drop Vdrop from the motor inter-terminal voltage Vt to the coil application voltage Va, a drive current detection value Isns corresponding to the above motor current Ia, a coil resistance equivalent value Rac corresponding to the above coil resistance value Ra, and a reverse voltage constant equivalent value Kec corresponding to the above reverse voltage constant Ke.

The equation (1) for computing the motor rotation speed estimation signal ωest_bk is given below once more.

$$\omega est\_bk = (Vt\text{-}sns - V\text{comp} - Isns \times Rac)/Kec \quad (1)$$

The above equation (1) is obtained by writing the above physical equations (2), (3), (5) and (6) on software and parameters Rac and Kec are prestored in the ROM. Since the above voltage drop Vdrop depends on a current value, the above Vcomp is prestored in the ROM as a map value for the drive current detection value Isns. When Vdrop is sufficiently small, the compensation value Vcomp may be regarded as "0".

In Embodiment 2, the rotation speed estimation unit 13 for estimating the rotation speed of the motor 8 based on the inter-terminal voltage detection value Vt-sns detected by the inter-terminal voltage detector 12 and the drive current detection value Isns detected by the current detector 9 is provided to compute the motor rotation speed estimation signal ωest_bk, and this motor rotation speed estimation signal ωest_bk is applied to the rotation speed HPF 11 to compute a damping current based on the output of the rotation speed HPF from which a steering frequency component has been removed. Therefore, the expensive motor rotation speed sensor 10 is not necessary, thereby making it possible to reduce the cost of the electric power steering control system.

Embodiment 3

Figure 5:
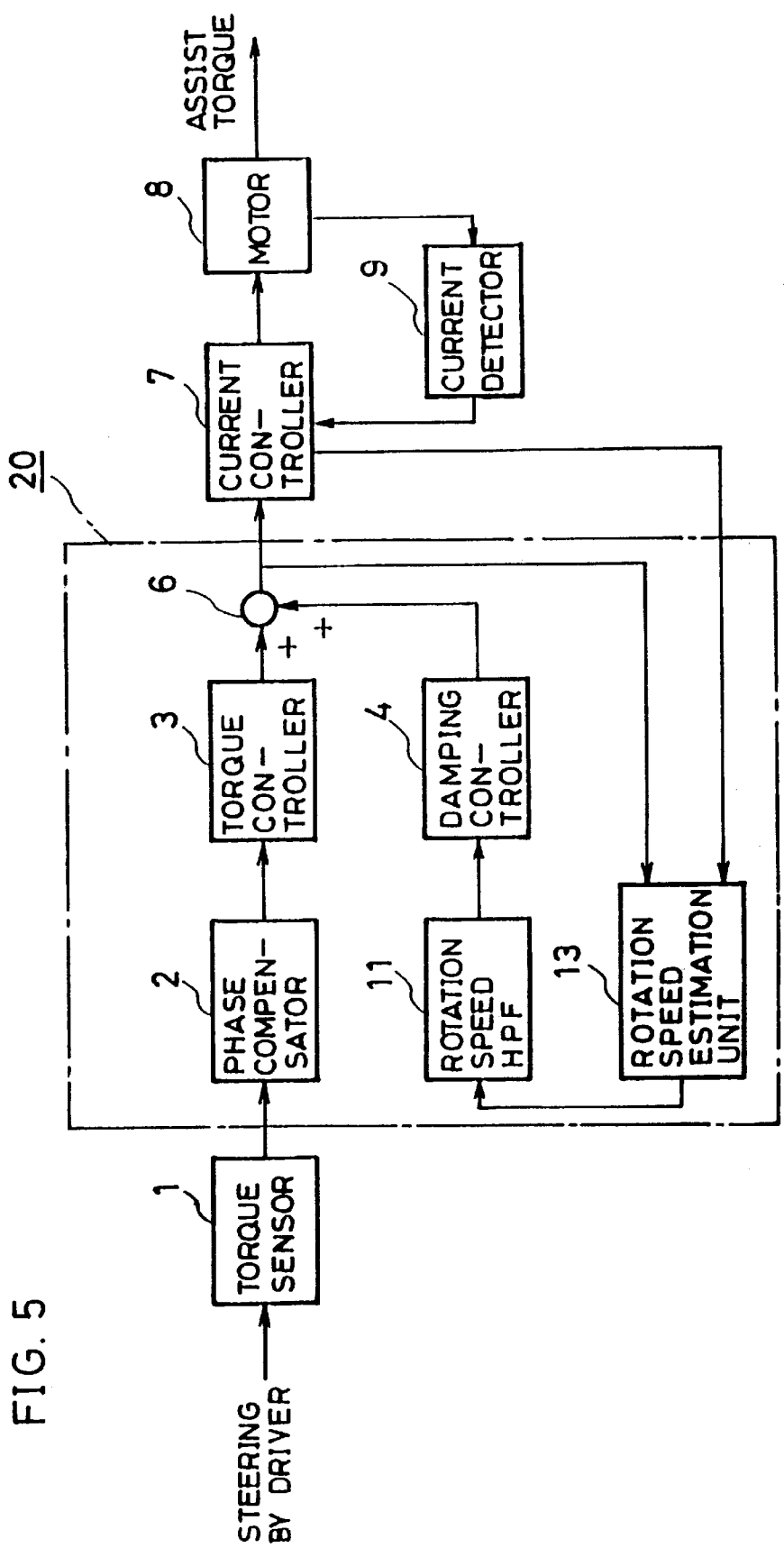
FIG. 5 is a block diagram of an electric power steering control system according to Embodiment 3 of the present invention.

FIG. 5 is a block diagram showing an electric power steering control system according to Embodiment 3 of the present invention. In Embodiment 2, the motor rotation speed estimation signal ωest_bk is obtained by estimating the rotation speed of the motor by the rotation speed estimation unit 13 for estimating the rotation speed of the motor from the inter-terminal voltage detection value Vt_sns of the motor and the drive current detection value Isns. In this Embodiment 3, as shown in FIG. 5, a rotation speed estimation unit 13 for estimating the rotation speed of the motor 8 based on the target current and the inter-terminal voltage instruction value from the current controller 7 is provided to compute the motor rotation speed estimation signal ωest_bk, and this motor rotation speed estimation signal ωest_bk is applied to the above rotation speed HPF 11 to compute a damping current based on the output of the rotation speed HPF from which a steering frequency component has been removed. The above target current and the inter-terminal voltage instruction value are values set by the controller (current controller 7). The target current from the current controller 7 is a current value to be applied to the motor 8.

Figure 6:
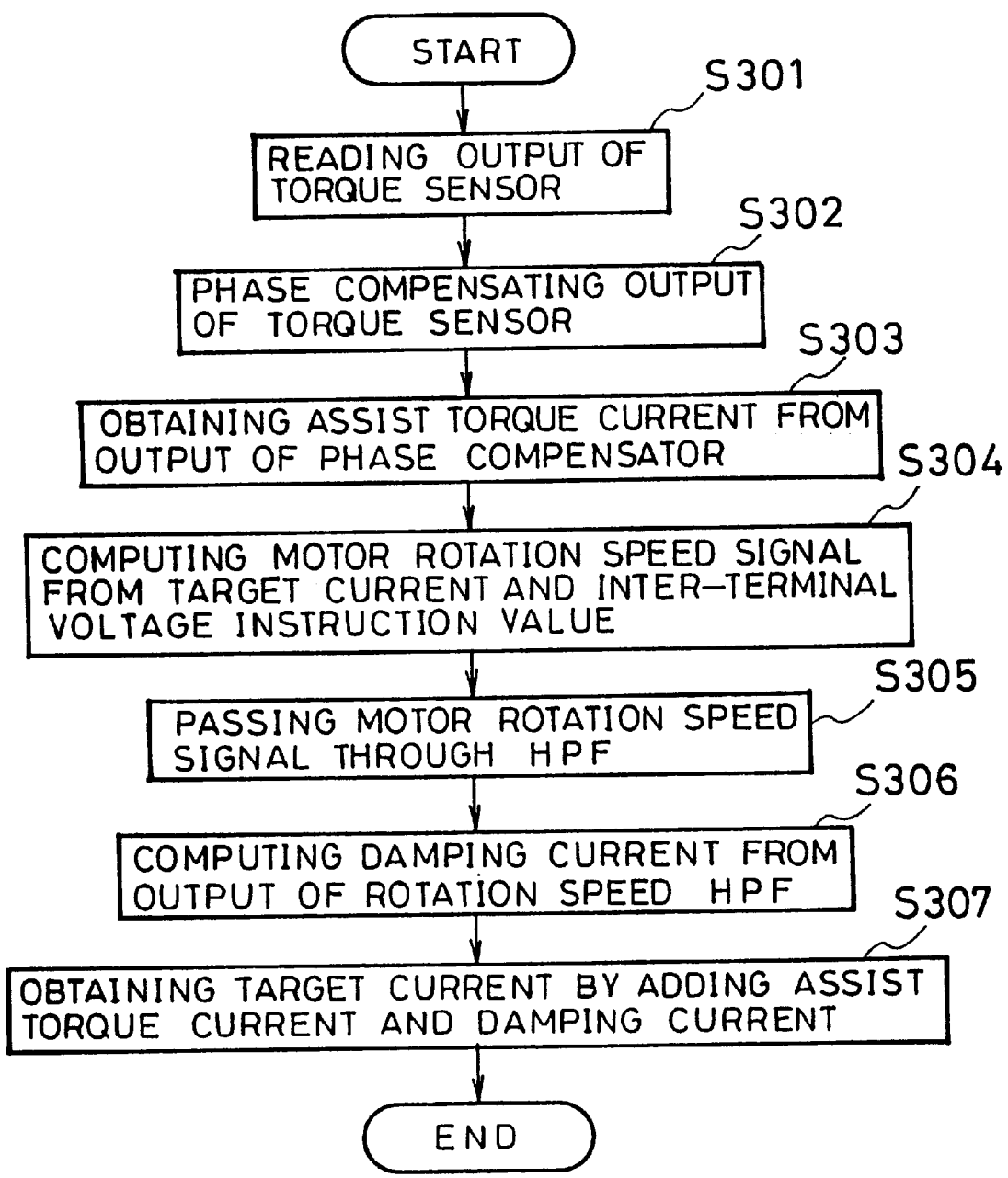
FIG. 6 is a flow chart showing an Embodiment 3.

A description is subsequently given of the operation of the above electric power steering control system with reference to the flow chart of FIG. 6, focusing on algorithm for computing a target current.

In step S301, the output of the torque sensor is read and stored in the memory. In step S302, the phase compensator 2 reads the output of the torque sensor stored in the memory, carries out computation for phase compensation and stores the result of computation in the memory as the output of the phase compensator. In step S303, the torque controller 3 reads the output of the phase compensator stored in the memory, computes an assist torque current from the map and stores it in the memory.

In step S304, the rotation speed estimation unit 13 reads a drive current detection value Iref computed and stored in the memory by the adder 6 and a drive voltage instruction value Vt_ind computed and stored in the memory by the current controller 7, computes the motor rotation speed estimation signal ωest_bk according to the following equation (7) and stores it in the memory.

$$\omega est\_bk = (Vt\_ind - V\text{comp} - V\text{comp2} - Iref \times Rac)/Kec \quad (7)$$

The above Vcomp2 is a compensation value corresponding to the voltage drop (Vt_ind−Vt) from the drive voltage instruction value to the inter-terminal voltage of the motor and prestored in the ROM as a map value for the drive current detection value Isns because the voltage drop depends on a current value. When the voltage drop from the drive voltage instruction value to the inter-terminal voltage is sufficiently small, the above Vcomp2 may be regarded as "0".

In the subsequent step S305, the rotation speed HPF 11 reads the motor rotation speed estimation signal ωest_bk stored in the memory, carries out the computation of a high-pass filter and stores the result of computation in the memory as the output of the rotation speed HPF. In step S306, the damping controller 4 reads the output of the rotation speed HPF stored in the memory and computes a damping current by multiplying the output by a control gain. In step S307, the adder 6 adds the assist torque current and the damping current stored in the memories to obtain a target current and stores the target current in the memory.

The operation of the above steps from S301 to S307 is repeated for each control sampling, and the target current of the motor 8 is computed from the phase compensated output of the torque sensor and the motor rotation speed signal from which a steering frequency component has been removed.

Thus, in this Embodiment 3, the rotation speed estimation unit 13 for estimating the motor rotation speed estimation signal ωest_bk from the drive voltage instruction value Vt_ind and the target current Iref set by the controller is provided, and the damping current is computed based on the output of the rotation speed HPF which is the motor rotation speed estimation signal ωest_bk from which a steering frequency component has been removed by the rotation speed HPF 11. Therefore, the damping current can be obtained accurately without being influenced by noise when a drive current, terminal voltage or the like is detected.

In the above Embodiment 3, a voltage and current to be applied to the motor are an instruction value and target value set by the controller (current controller 7). Either one of them may be a measured detection value.

Embodiment 4

Embodiment 4 of the present invention will be described next.

In this Embodiment 4, only arithmetic algorithm for computing the motor rotation speed estimation signal (ωest_bk) by means of the rotation speed estimation unit 13 in the above Embodiment 2 is changed, the motor rotation speed estimation signal (ωest_bk) is computed, taking into consideration the characteristics of coil inductance, and the oscillation frequency component of the rotation speed of the motor 8 can be estimated accurately even when steering oscillation is generated at a high frequency. The constitution of the electric power steering control system of this Embodiment 4 is the same as that of the block diagram of FIG. 3.

Figure 7:
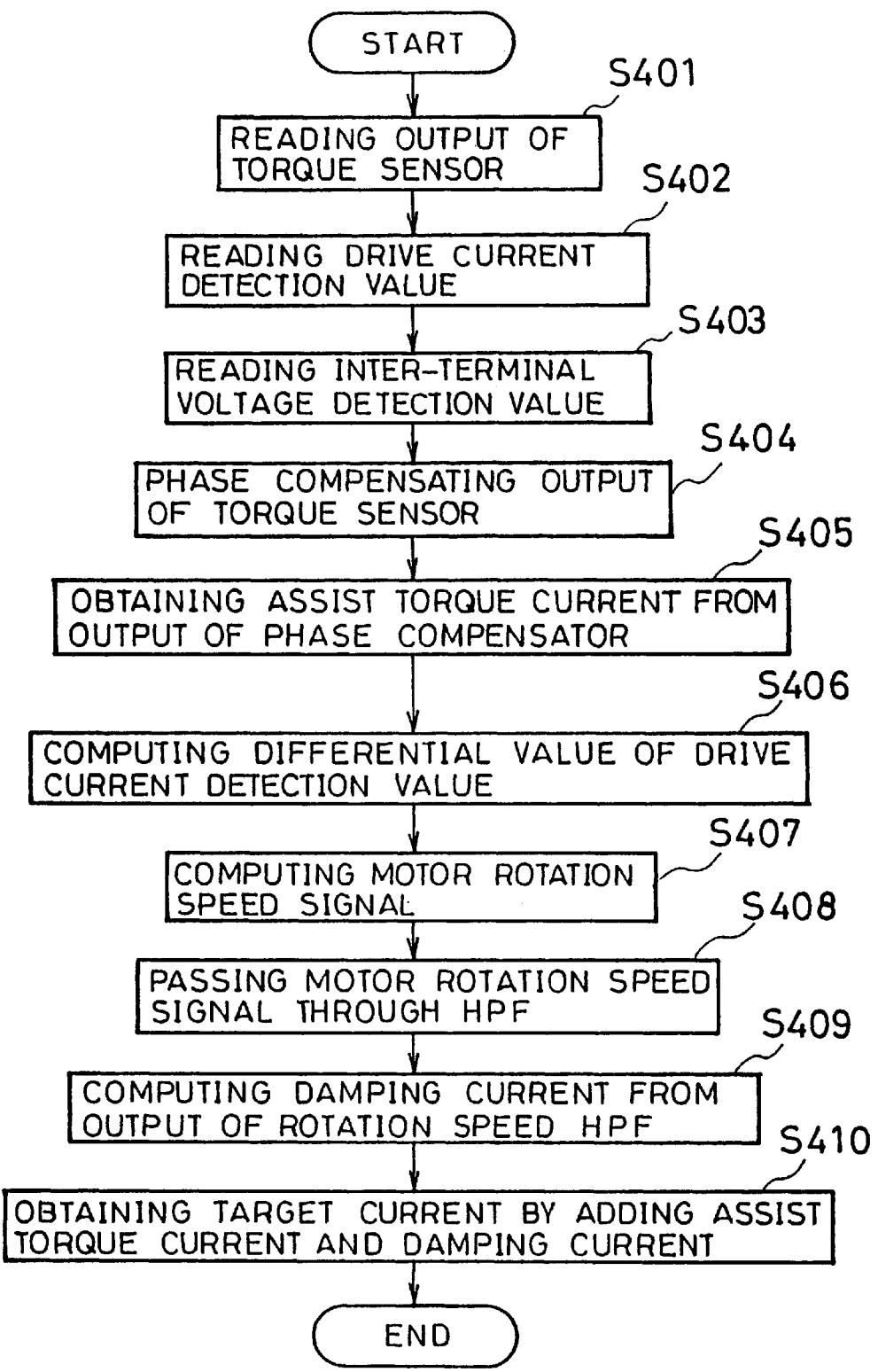
FIG. 7 is a flow chart showing an Embodiment 4.

Only an algorithm for computing a target current will be described with reference to the flow chart of FIG. 7.

The output of the torque sensor is read and stored in the memory in step S401, a drive current detection value is read and stored in the memory in step S402, and an inter-terminal voltage detection value is read and stored in the memory in step S403. In step S404, the phase compensator 2 reads the output of the torque sensor stored in the memory, carries out computation for phase compensation and stores the result of computation in the memory as the output of the phase compensator. In step S405, the torque controller 3 reads the output of the phase compensator stored in the memory, computes an assist torque current from the map and stores it in the memory.

Steps S406 and S407 indicate the operation of the rotation speed estimation unit 13. In step S406, the drive current detection value Isns and the inter-terminal voltage detection value Vt_sns stored in the memories are read and a difference between the drive current detection value Isns(k) of the current sampling time and the drive current detection value Isns(k−1) of the previous sampling time is obtained to compute a differential value (dIsns) of the drive current detection value (Isns) as shown in the following equation (8).

$$dIsns(k)=\{Isns(k)-Isns(k-1)\}/Tsamp \qquad (8)$$

wherein K is the number of times of control sampling and Tsamp is a control sampling time.

In the subsequent step S407, after a coil voltage drop Vc is obtained from the drive current detection value Isns and disns(k) obtained from the above equation (8) by reverse characteristics computing means for obtaining a coil voltage corresponding to the reverse characteristics of coil impedance from a coil current, a motor rotation speed estimation signal ($\omega$est_bk) is computed according to the following equation (9) and stored in the memory.

$$\omega est\_bk=(Vt\_sns-Vcomp-Isns \times Rac-Lac \times dIsns)/Kec \qquad (9)$$

wherein Lac is a coil inductance equivalent value and −Lac×dIsns/Kec is a term relating to the characteristics of coil inductance.

In the subsequent step S408, the rotation speed HPF 11 reads the above motor rotation speed estimation signal $\omega$est_bk stored in the memory, carries out the computation of a high-pass filter, and stores the result of computation in the memory as the output of the rotation speed HPF. In step S409, the damping controller 4 reads the output of the rotation speed HPF stored in the memory and computes a damping current by multiplying the output by a control gain. In step S410, the adder 6 adds the assist torque current and the damping current stored in the memories to obtain a target current and stores the target current in the memory.

The operation of the above steps from S401 to S410 is repeated for each control sampling, and the target current of the motor 8 is computed from the phase compensated output of the torque sensor and the motor rotation speed estimation signal from which a steering frequency component has been removed.

The equation (9) for computing the motor rotation speed estimation signal $\omega$est_bk is obtained by writing the above physical equations (2) to (4) and (6) on software and the above coil inductance equivalent value Lac is prestored in the ROM like Rac and Kec.

Thus, in this Embodiment 4, when the rotation speed of the motor is estimated by obtaining a coil voltage drop equivalent value from the inter-terminal voltage detection value and the drive current detection value of the motor 8, the characteristics of coil inductance are taken into consideration. Therefore, the oscillation frequency component of the rotation speed of the motor 8 can be accurately estimated even when steering oscillation occurs at a high frequency.

In the above Embodiment 4, the motor rotation speed estimation signal ($\omega$est_bk) is computed from the drive current detection value (Isns) and the inter-terminal voltage detection value (Vt_sns). Like Embodiment 3, the motor rotation speed estimation signal ($\omega$est_bk) may be computed using either one or both of a voltage value to be applied to the motor 8 and a current value to be applied to the motor 8 as a drive voltage instruction value or/and a target current.

Embodiment 5

Embodiment 5 of the present invention will be described next.

In Embodiment 5, only arithmetic algorithm for computing the motor rotation speed estimation signal by means of the rotation speed estimation unit 13 in the above Embodiment 2 is changed, the characteristics of coil inductance are taken into consideration when the rotation speed of the motor is estimated from the inter-terminal voltage detection value and the drive current detection value of the motor 8, the reverse characteristics computing means for obtaining a coil voltage drop equivalent value has such frequency characteristics that gain and phase thereof agree with the reverse characteristics of coil impedance only at a frequency at which steering oscillation occurs at the time of steering, and the rotation speed of the motor is estimated accurately only at a frequency at which steering oscillation occurs. The constitution of the electric power steering control system of this Embodiment 4 is the same as that of the block diagram of FIG. 3.

Figure 8:
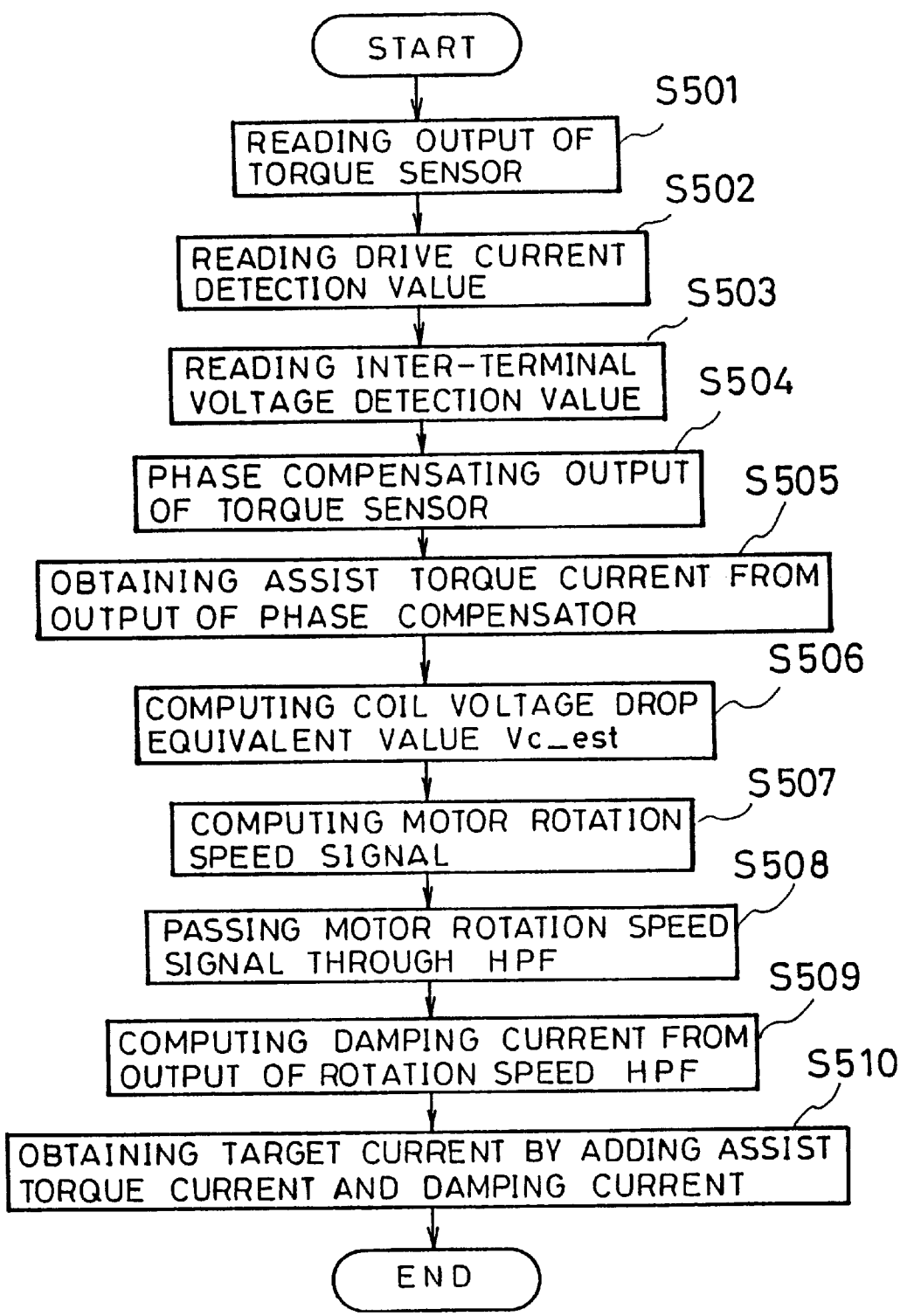
FIG. 8 is a flow chart showing an Embodiment 5.

Only an algorithm for computing a target current will be described hereinunder with reference to the flow chart of FIG. 8.

The output of the torque sensor is first read and stored in the memory in step S501, a drive current detection value is read and stored in the memory in step S502, and an inter-terminal voltage detection value is read and stored in the memory in step S503. In step S504, the phase compensator 2 reads the output of the torque sensor stored in the memory, carries out computation for phase compensation and stores the result of computation in the memory as the output of the phase compensator. In step S505, the torque controller 3 reads the output of the phase compensator stored in the memory, computes an assist torque current from the map and stores it in the memory.

Steps S506 and S507 indicate the operation of the rotation speed estimation unit 13. In step S506, the drive current detection value (Isns) and the inter-terminal voltage detection value (Vt_sns) stored in the memories are read, and the drive current detection value (Isns) is processed by a filter to compute a coil voltage drop equivalent value Vc-est according to the following equation (19).

$$x(k+1)=Isns(k)-Gcomp1 \cdot \{Isns(k)-x(k)\} Vc\text{-}est(k)=Gcomp3 \cdot [(x(k)+Gcomp2 \cdot \{Isns(k)-x(k)\}] \qquad (10)$$

wherein Gcomp1, Gcomp2 and Gcomp3 are parameters of the filter obtained when an analog filter corresponding to the transmission function G(s) of the following equation (11) is digitized and prestored in the ROM. X(k) is an intermediate state value when the coil voltage drop equivalent value Vc-est is obtained from the drive current detection value Isns. When k=0, the initial value prestored in the ROM is read to carry out computation.

$$G(s)=Gcomp3 \cdot \{(Tcomp1 \cdot +1)/(Tcomp2 \cdot S+1)\} \qquad (11)$$

The filter of the above equation (11) sets the parameters Tcomp1, Tcomp2 and Gcomp3 such that gain and phase thereof agree with the reverse characteristics of the actual coil at a frequency at which steering oscillation occurs as shown in the graphs of FIG. 9.

In the subsequent step S507, the motor rotation speed estimation signal ωest_bk is computed from Vc_est(k) obtained from the above equation (10) according to the following equation (12) and stored in the memory.

$$\omega est\_bk=(Vt\_sns-Vcomp-Vc\_est)/Kec \qquad (12)$$

In the following step S508, the rotation speed HPF 11 reads the above motor rotation speed estimation signal ωest_bk stored in the memory, carries out the computation of a high-pass filter and store the result of computation in the memory as the output of the rotation speed HPF. In step S509, the damping controller 4 reads the output of the rotation speed HPF stored in the memory and computes a damping current by multiplying the output by a control gain. In step S510, the adder 6 adds the assist torque current and the damping current stored in the memories to obtain a target current and stores the target current in the memory.

The operation of the above steps from S501 to S510 is repeated for each control sampling, and the target current of the motor 8 is computed from the phase compensated output of the torque sensor and the motor rotation speed estimation signal from which a steering frequency component has been removed.

Thus, in this Embodiment 5, the characteristics of coil inductance are taken into consideration when the rotation speed of the motor is estimated for the inter-terminal voltage detection value and the drive current detection value of the motor 8, and the rotation speed of the motor is estimated accurately only at a frequency at which steering oscillation occurs. Therefore, gain at a high frequency range can be made lower than when the rotation speed of the motor is estimated simply by computing the reverse characteristics of inductance, thereby making it possible to reduce the influence of noise having a high frequency.

A current detection value or instruction value to be applied to the motor is set such that the reverse characteristics of coil impedance agree with the gain and phase of the filter only at a frequency at which steering oscillation occurs at the time of steering. Therefore, as the gain and phase of the filter can be freely changed at a frequency other than the above frequency at which steering oscillation occurs, the rotation speed of the motor can be estimated accurately at a frequency at which damping is made effective.

Embodiment 6

FIG. 10 is a block diagram showing an electric power steering control system according to Embodiment 6 of the present invention. In FIG. 10, reference numeral 1 denotes a torque sensor for detecting steering torque when a driver steers an automobile, 2 a phase compensator for phase compensating the output signal of the torque sensor 1 to improve the frequency characteristics of the signal, and 3 a torque controller for computing an assist torque current to be applied to the motor 8 for generating torque for assisting the above steering torque based on the phase compensated output of the torque sensor 1.

Denoted by 15 is a drive current HPF for removing a steering frequency component from a drive current detection value detected by the current detector 9, 16 a motor angle HPF for removing a steering frequency component from a rotation angle detection value detected by a rotation angle detector 14 for detecting the rotation angle of the motor 8, 17 a rotation speed observer for estimating the rotation speed of the motor based on the output of the above drive current HPF 15 and the output of the motor angle HPF 16 and outputting a motor rotation speed estimation signal, which is constructed for an oscillation equation containing the inertia moment of the motor as an inertia term and the rigidity of the torque sensor as a spring term, 4 a damping controller for computing a damping current based on the output of the rotation speed observer, and 6 an adder for computing a target current by adding the assist torque current computed by the above torque controller 3 and the damping current computed by the damping controller 4. Reference numeral 7 denotes a current controller for setting a drive voltage instruction value to be applied to the terminals of the motor 8 such that the drive current detection value to be applied to the motor 8 to generate assist torque and detected by the current detector 9 becomes equal to the target current and outputting it as a PWM signal.

A description is subsequently given of the above rotation speed observer 17.

The mechanism of steering is represented by balance between steering torque which is input by the operation of the steering wheel by the driver and reaction torque essentially composed of assist torque generated by the motor and reaction force from tires. Steering oscillation generally occurs at a frequency higher than 30 Hz. Since changes in the angle of the steering wheel and changes in reaction force from the road becomes so small that they are negligible at this high frequency, the motor can be regarded as an oscillation system supported by the torque sensor having spring characteristics. Therefore, if the rotation speed observer is constructed based on a kinetic equation corresponding to this, for example, an oscillation equation containing the inertia moment of the motor as an inertia term and the rigidity of the torque sensor as a spring term, the rotation speed of the motor can be estimated at a frequency range higher than a steering frequency without using a differentiator required to obtain a coil voltage drop from a coil current.

The above drive current HPF 15 and the above motor angle HPF 16 are a high-pass filter having a folding point frequency of 0.2 to 30 Hz which is the maximum frequency of steering by a general driver like the above-described rotation speed HPF 11. Therefore, a steering frequency component can be properly removed from the rotation speed of the motor.

A description is subsequently given of the operation of the above electric power steering control system with reference to the flow chart of FIG. 11. In this Embodiment 6, an algorithm for computing a target current by means of the target current computing means 20 will be described, like the above Embodiments 1 to 5.

The output of the torque sensor is read and stored in the memory in step S601, a drive current detection value is read and stored in the memory in step S602, and a rotation angle detection value is read and stored in the memory in step S603. In step S604, the phase compensator 2 read the output of the torque sensor stored in the memory, carries out computation for phase compensation and stores the result of computation in the memory as the output of the phase compensator. In step S605, the torque controller 3 reads the output of the phase compensator stored in the memory, computes an assist torque current from the map and stores it in the memory.

In step S606, the drive current HPF 15 reads the drive current detection value stored in the memory, passes it through a high-pass filter to remove a steering frequency component from the above drive current detection value and stores the obtained value in the memory as the output of the drive current HPF (Ifilt). In step S607, the motor angle HPF 16 reads the rotation angle detection value stored in the memory, converts it into the rotation angle of the steering shaft, passes it through a high-pass filter to remove a steering freuqency component from the converted rotation angle detection value and stores the obtained value in the memory as the output of the motor angle HPF (θfilt).

In step S608, the rotation speed observer 17 reads the output Ifilt of the drive current HPF and the output θfilt of the motor angle HPF stored in the memories, computes a motor rotation speed estimation signal (ωest_obs) from the following equation (13) and stores it in the memory.

$$u1(k)=Gobs1 \times \theta filt(k)+Gobs2 \times Ifilt(k)x(k+1)=Gobs3 \cdot x(k)+ Gobs4 \cdot u1(k)\omega est\_{obs}(k)=Gobs5 \cdot x(k)+Gobs6 \cdot \theta filt(k) \quad (13)$$

The above parameters Gobs1, Gobs2, Gobs3, Gobs4, Gobs5 and Gobs6 are obtained when the minimum-dimensional observer for a single-freedom oscillation equation containing the inertia moment of the motor as an inertia term and the spring constant of the torque sensor as a spring term shown in the following equation (14) is digitized and prestored in the ROM. The above x(k) is an intermediate state value when the motor rotation speed estimation signal ωest_obs is obtained from the output Ifilt of the drive current HPF and the output θfilt of the motor angle HPF. When k=0, the initial value prestored in the ROM is read for computation.

$$d^2\theta vib/dt^2 = -C/J(d\theta vib/dt)+(KTSEN/J)\cdot \theta vib+(KT/J)\cdot Ivib \quad (14)$$

wherein θvib is the rotation angle of the motor from which a steering frequency component is removed (in terms of the steering shaft), Ivib is the drive current of the motor from which a steering frequency component is removed, J is the inertia moment of the motor when seen from the steering shaft, C is the damping constant of the torque sensor when seen from the steering shaft, KTSEN is the spring constant of the torque sensor when seen from the steering shaft and KT is the torque constant of the motor when seen from the steering shaft.

In the subsequent step S609, the damping controller 4 reads the motor rotation speed estimation signal ωest_obs stored in the memory and computes a damping current by multiplying the signal by a control gain. In step S610, the adder 6 adds the assist torque current and the damping current stored in the memories to obtain a target current and stores the target current in the memory.

The operation of the above steps from S601 to S610 is repeated for each control sampling, and the target current of the motor 8 is computed from the phase compensated output of the torque sensor and the motor rotation speed estimation signal from which a steering frequency component has been removed.

Thus, in this Embodiment 6, the rotation speed of the motor is estimated from the inter-terminal voltage detection value of the motor and the rotation angle detection value of the motor. In an electric power steering system equipped with a brushless motor and capable of detecting the rotation angle of the motor, for example, the rotation speed of the motor can be estimated from both the rotation angle of the motor and the current of the motor. Therefore, even when the rotation angle of the motor cannot be detected accurately because steering oscillation or the rotation angle of the motor is extremely small, the rotation speed of the motor can be obtained with higher accuracy than when the rotation speed of the motor is estimated by differentiating the rotation angle of the motor.

In the above Embodiment 6, when the rotation speed observer 17 computes the motor rotation speed estimation signal, the minimum-dimensional observer which is a one-dimensional observer is constructed for the two-dimensional model of the above equation (14). The same-dimensional observer which is a two-dimensional observer may be constructed.

Embodiment 7

Embodiment 7 of the present invention will be described below.

FIG. 12 is a block diagram showing an electric power steering control system according to Embodiment 7 of the present invention. In the above Embodiment 6, the rotation speed observer 17 for estimating the rotation speed of the motor from which a steering frequency component has been removed based on the output of the drive current HPF and the output of the motor angle HPF is provided to output a motor rotation speed estimation signal from which a steering frequency component has been removed. In this Embodiment 7, as shown in FIG. 12, a torque HPF 18 for removing a steering frequency component from the output of the torque sensor 1 is provided and a rotation speed observer 17 for computing a rotation speed estimation signal from the output of the torque HPF and the output of the drive current HPF from which a steering frequency component has been removed by passing a drive current detection value detected by the current detector 9 through the drive current HPF 15, which is constructed for an oscillation equation containing the inertia moment of the motor as an inertia term and the rigidity of the torque sensor as a spring term, is provided to compute a damping current based on the output of the rotation speed observer.

A description is subsequently given of the rotation speed observer 17.

At a high frequency range at which steering oscillation occurs, the steering wheel rarely moves due to the holding of the steering wheel by the driver and the influence of the inertia of the steering wheel itself. Therefore, the helix angle of the torque sensor having spring characteristics can be regarded as the rotation angle of the motor, the output of the torque sensor is divided by the spring constant of the torque sensor to remove a steering frequency component, and a signal equivalent to the rotation angle of the motor of the above Embodiment 6 can be obtained by inverting the sign of the obtained value. The above rotation observer 17 uses an oscillation equation containing the inertia moment of the motor as an inertia term and the rigidity of the torque sensor as a spring term to estimate the rotation speed based on the signal equivalent to the rotation angle of the motor and the drive current detection value detected by the current detector 9.

Only an algorithm for computing a target current will be described with reference to the flow chart of FIG. 13.

The output of the torque sensor is read and stored in the memory in step S701, and a drive current detection value is read and stored in the memory in step S702. In step S703, the phase compensator 2 reads the output of the torque sensor stored in the memory, carries out computation for phase compensation and stores the result of computation in the memory as the output of the phase compensator. In step S704, the torque controller 3 reads the output of the phase compensator stored in the memory, computes an assist torque current from the map and stores it in the memory. In step S705, the drive current HPF 15 reads the drive current detection value stored in the memory, passes it through a high-pass filter to remove a steering frequency component and stores the obtained value in the memory as the output of the drive current HPF (Ifilt). In step S706, the torque HPF 18 reads the output of the torque sensor stored in the memory, passes it through a high-pass filter to remove a steering frequency component and stores the obtained value in the memory as the output of the torque HPF (Tfilt).

In step S707, the rotation speed observer 17 reads the output of the drive current HPF (Ifilt) and the output of the torque HPF (Tfilt) stored in the memories, computes a motor rotation speed estimation signal (ωest_obs) from the following equation (15) and stores it in the memory.

$$u1(k)=Gobs1\times(-Tfilt(k)/KTSEN)+Gobs2\times Ifilt(k)x(k+1)=\\Gobs3\cdot x(k)+Gobs4\cdot u1(k)\omega est\_obs(k)=Gobs5\cdot x(k)+\\Gobs6\cdot\theta filt(k) \quad (14)$$

The above parameters Gobs1, Gobs2, Gobs3, Gobs4, Gobs5, Gobs6, and x(k) are the same as in the above equation (13).

In the subsequent step S708, the damping controller 4 reads the motor rotation speed estimation signal ωest_obs stored in the memory and computes a damping current by multiplying the signal by a control gain. In step S709, the adder 6 adds the assist torque current and the damping current stored in the memories to obtain a target current and stores the target current in the memory.

The operation of the above steps from S701 to S709 is repeated for each control sampling, and the target current of the motor 8 is computed from the phase compensated output of the torque sensor and the motor rotation speed estimation signal from which a steering frequency component has been removed.

Thus, in this Embodiment 7, since the rotation angle of the motor is estimated from the output of the torque sensor, even in an electric power steering system having no sensor for detecting the rotation angle of the motor, the rotation speed of the motor can be estimated and an expensive motor rotation angle sensor is not necessary.

In this Embodiment 7, the same-dimensional observer may be constructed like the above Embodiment 6. Although the output of the torque sensor is used as a steering torque signal in this Embodiment 7, the output of the phase compensator whose frequency characteristics have been improved by the phase compensator 2 may be used as the steering torque signal.

Embodiment 8

FIG. 14 is a block diagram showing an electric power steering control system according to Embodiment 8 of the present invention. In FIG. 14, reference numeral 1 denotes a torque sensor for detecting steering torque when a driver steers an automobile, 2 a phase compensator for improving the frequency characteristics of the output signal of the torque sensor, 3 a torque controller for computing an assist torque current based on the phase compensated output of the torque sensor 1, and 4 a damping controller for computing a damping current based on the output of a rotation speed HPF from which a steering frequency component has been removed by applying a motor rotation speed estimation signal detected by a motor rotation speed sensor 10 to a rotation speed HPF 11. Denoted by 6 is an adder for adding the assist torque current computed by the torque controller 3 and the damping current computed by the damping controller 4 to obtain a target current. Reference numeral 7 indicates a current controller for setting a drive voltage instruction value to be applied to the terminals of the motor 8 such that a drive current detection value detected by a current detector 9 for detecting a drive current to be applied to the motor 8 to generate assist torque becomes equal to the target current and outputting it as a PWM signal, for example. In this Embodiment 8, car speed detection means 19 is further provided to change the parameters of the phase compensator 2, the torque controller 3, the rotation speed HPF 11 and the damping controller 4 according to a car speed signal Vs from the car speed detection means 19.

Since the frequency range of steering by the driver differs and reaction force from the tires changes according to car speed, the relationship between the phase compensated output of the torque sensor 1 and the assist torque current of the torque controller 3 is changed accordingly. When the relationship between the phase compensated output of the torque sensor 1 and the assist torque current changes, a frequency range at which steering oscillation easily occurs and the probability of oscillation vary.

In this Embodiment 8, by making these parameters variable by car speed, the optimum control can be carried out according to the frequency range of steering by a driver which differs according to car speed and a frequency range at which steering oscillation easily occurs.

As for the operation of this Embodiment 8, an algorithm for computing a target current will be described with reference to the flow chart of FIG. 15.

The output of the torque sensor is first read and stored in the memory in step S801, the motor rotation speed estimation signal is read and stored in the memory in step S802, and the car speed signal is read and stored in the memory in step S803. A parameter for determining the frequency characteristics of the phase compensator 2 is read from the map based on the car speed signal Vs in step S804, the output of the torque sensor stored in the memory is read to carry out computation for phase compensation, and the result of computation is stored in the memory as the output of the phase compensator in step S805. The torque controller 3 reads the relationship between the phase compensated output of the torque sensor 1 and an assist torque current from a two-dimensional map based on the car speed signal in step S806, and also reads the output of the phase compensator stored in the memory to compute an assist torque current from the map and stores the assist torque current in the memory in step S807. The rotation speed HPF 11 reads a parameter for determining a frequency range to be removed by the rotation speed HPF 11 from the map based on the car speed signal Vs in step 808, and also reads the motor rotation speed estimation signal stored in the memory to carry out the computation of a high-pass filter and stores the result of computation in the memory as the output of the rotation speed HPF in step S809. The damping controller 4 reads a control gain from the map based on the car speed signal in step S810, and also reads the output of the rotation speed HPF stored in the memory and computes a damping current by multiplying the output by the control gain in step S811. In step S812, the adder 6 adds the assist torque current and the damping current stored in the memories to obtain a target current and stores the target current in the memory.

The operation of the above steps from S801 to S812 is repeated for each control sampling, and the target current of the motor 8 is computed based on the car speed signal Vs from the phase compensated output of the torque sensor and the motor rotation speed estimation signal from which a steering frequency component has been removed.

Thus, in this Embodiment 8, since the frequency range to be removed by the steering component removing means is changed according to the car speed signal Vs and the parameters of the control system are also changed according to the car speed signal Vs, the optimum control can be carried out according to the frequency range of steering by a driver which differs according to car speed and a frequency range at which steering oscillation easily occurs.

In the above Embodiment 8, control parameters are changed according to the car speed signal Vs unlike the above Embodiment 1. The control parameters may be changed according to the car speed signal Vs in the electric power steering control systems of the above Embodiments 2 to 7.

As having been described above, according to the first aspect of the present invention, rotation speed detection means for estimating or measuring the rotation speed of the motor is provided and steering component removing means for removing a steering speed component from the estimated or measured rotation speed of the motor is also provided so that a damping compensation current to be applied to prevent the oscillation of a steering system is computed after a steering speed component is removed from a motor rotation speed measurement or estimation signal. Therefore, even when a damping current is increased to improve a torque proportional gain, the damping current does not function as the resistance of steering torque, whereby the steering torque can be reduced without making the driver feel the vibration of the steering wheel.

According to the second aspect of the present invention, since the steering component removing means is a frequency separator for separating the frequency of the rotation speed of the motor and removing a steering frequency component, the steering frequency component can be removed from the rotation speed of the motor by a simple-structured filter which is commonly used for control.

According to the third aspect of the present invention, since the steering component removing means is a high-pass filter whose folding point frequency is set to a range of 0.2 to 30 Hz which is the maximum frequency of steering by a general driver, a steering frequency component can be properly removed from the rotation speed of the motor.

According to the fourth aspect of the present invention, the rotation speed detection means is a rotation speed estimation unit for estimating the reverse voltage of the motor by subtracting a coil voltage drop equivalent value in the motor computed based on a motor current detection value or instruction value from a motor inter-terminal voltage measurement value or instruction value and computing a motor rotation speed estimation value based on the estimated reverse voltage. Therefore, an expensive motor rotation speed sensor is not necessary and the cost of an electric power steering system can be reduced.

According to the fifth aspect of the present invention, the coil voltage drop equivalent value is computed by reverse characteristics computing means for obtaining a coil voltage corresponding to the reverse characteristics of coil impedance from a current detection value or instruction value to be applied to the motor. Therefore, the coil voltage drop equivalent value can be obtained at a higher frequency range and a steering frequency component can be properly removed from the rotation speed of the motor.

According to the sixth aspect of the present invention, the above reverse characteristics computing means has such frequency characteristics that gain and phase thereof agree with the reverse characteristics of coil impedance only at a frequency at which steering oscillation occurs at the time of steering. Therefore, the gain or phase of the filter can be freely changed at a frequency other than the frequency at which steering oscillation occurs. Accordingly, the rotation speed of the motor can be estimated accurately at a frequency at which damping is made effective and the influence of noise at a high frequency can be minimized.

According to the seventh aspect of the present invention, the rotation speed observer for computing a motor rotation speed estimation value based on the output of the second steering component removing means for removing a steering component from the motor rotation angle detection value and the output of the third steering component removing means for removing a steering component from the current detection value or instruction value to be applied to the motor is constructed for the oscillation equation containing the inertia moment of the motor as an inertia term and the rigidity of the torque sensor as a spring term. Therefore, the rotation speed of the motor can be obtained accurately at a frequency range higher than the steering frequency without using a differentiator required to obtain a coil voltage drop from a coil current.

According to the eighth aspect of the present invention, the rotation speed observer for computing a motor rotation speed estimation value based on the output of the third steering component removing means for removing a steering component from a current detection value or instruction value to be applied to the motor and the output of the fourth steering component removing means for removing a steering component from the output of the steering torque detection means is constructed for the oscillation equation containing the inertia moment of the motor as an inertia term and the rigidity of the torque sensor as a spring term, and a signal equivalent to the rotation angle of the motor is obtained by dividing the output of the torque sensor by the spring constant of the torque sensor. Therefore, the rotation speed of the motor can be obtained accurately without using an expensive motor rotation angle sensor.

According to the ninth aspect of the present invention, the car speed detection means is provided to change the frequency range to be removed by any one or all of the above steering component removing means according to car speed. Therefore, the optimum control of a steering frequency range or a frequency range where steering oscillation readily occurs can be carried out according to car speed.

What is claimed is:

1. An electric power steering control system comprising:
   steering torque detection means for detecting a steering torque of a driver;
   a motor for generating a torque for assisting the steering torque;
   rotation speed detecting means for obtaining a rotation speed of a motor; and
   steering component removing means for removing a steering speed component from the rotation speed of the motor, the steering component removing means comprising a frequency separator for removing a steering frequency component from the rotation speed of the motor.

2. The electric power steering control system of claim 1, wherein the frequency separator comprises a high-pass filter with a folding point frequency set to a range of 0.2 Hz to 30 Hz.

3. An electrical power steering control system comprising:
   steering torque detection means for detecting a steering torque of a driver;
   a motor for generating a torque for assisting the steering torque;
   rotation speed detection means for obtaining a rotation speed of the motor, the rotation speed detecting means comprising a rotation speed estimation unit for estimating a reverse voltage of the motor by subtracting a coil voltage drop equivalent of the motor from a motor inter-terminal voltage and computing a motor rotation speed estimation value based on the estimated reverse voltage, wherein the coil voltage drop equivalent is dependent on motor current; and steering component removing means for removing a steering speed component from the rotation speed of the motor.

4. The electric power steering control system of claim 3, wherein the coil voltage drop equivalent is computed by reverse characteristics computing means for obtaining a coil voltage corresponding to reverse characteristics of a coil impedance from a current to be applied to the motor.

5. The electric power steering control system of claim 4, wherein the reverse characteristics computing means has frequency characteristics such that its gain and phase agree with the reverse characteristics of the coil impedance only at a frequency at which steering oscillation occurs.

6. An electric power steering control system comprising:
steering torque detection means for detecting a steering torque of a driver;
a motor for generating a torque for assisting the steering torque;
rotation speed detection means for obtaining a rotation speed of the motor; and
first steering component removing means for removing a steering speed component from the rotation speed of the motor, the rotation speed detection means comprising:
  second steering component removing means for removing a steering component from a motor rotation angle detection value;
  third steering component removing means for removing a steering component from a current applied to the motor; and
  a rotation speed observer for computing a motor rotation speed estimation value based on a motor rotation angle and a motor current output from the second and third steering component removing means, considering an inertia moment of the motor and rigidity of a torque sensor.

7. An electric power steering control system comprising:
steering torque detection means for detecting a steering torque of a driver;
a motor for generating a torque for assisting the steering torque;
rotation speed detection means for obtaining a rotation speed of the motor; and
first steering component removing means for removing a steering speed component from the rotation speed of the motor, the rotation speed detection means comprising:
  second steering component removing means for removing a steering component from a current applied to the motor;
  third steering component removing means for removing a steering component from an output of the steering torque detection means; and
  a rotation speed observer for computing a motor rotation speed estimation value based on a motor current output and steering torque output from the second and third steering component removing means, considering an inertia moment of the motor and rigidity of a torque sensor.

8. The electric power steering control system of claim 1, comprising car speed detection means for changing a frequency range to be removed by the steering component removing means according to car speed.

9. An electric power steering control system comprising:
steering torque detection means for detecting a steering torque of a driver;
a motor for generating a torque for assisting the steering torque;
rotation speed detecting means for obtaining a rotation speed of a motor;
steering component removing means for removing a steering speed component from the rotation speed of the motor; and
car speed detection means for changing a frequency range to be removed by the steering component removing means according to car speed.

* * * * *